(12) United States Patent
Takeuchi et al.

(10) Patent No.: US 10,066,747 B2
(45) Date of Patent: Sep. 4, 2018

(54) TRANSMISSION

(71) Applicants: TOYOTA JIDOSHA KABUSHIKI KAISHA, Toyota-shi, Aichi-ken (JP); TOYOTA MOTORSPORT Gmbh, Cologne (DE)

(72) Inventors: Shinichi Takeuchi, Nisshin (JP); Lars Van Leeuwen, Baarlo (NL); Takushi Takamura, Cologne (DE)

(73) Assignees: TOYOTA JIDOSHA KABUSHIKI KAISHA, Toyota (JP); TOYOTA MOTORSPORT GMBH, Cologne (DE)

( * ) Notice: Subject to any disclaimer, the term of this patent is extended or adjusted under 35 U.S.C. 154(b) by 215 days.

(21) Appl. No.: 15/240,604

(22) Filed: Aug. 18, 2016

(65) Prior Publication Data
US 2017/0051811 A1 Feb. 23, 2017

(30) Foreign Application Priority Data
Aug. 21, 2015 (JP) ................. 2015-163643

(51) Int. Cl.
| | |
|---|---|
| F16H 3/38 | (2006.01) |
| F16H 63/30 | (2006.01) |
| F16D 21/04 | (2006.01) |
| F16D 11/10 | (2006.01) |
| F16H 3/091 | (2006.01) |
| F16H 55/17 | (2006.01) |

(52) U.S. Cl.
CPC ............ *F16H 63/30* (2013.01); *F16D 21/04* (2013.01); *F16D 11/10* (2013.01); *F16H 3/0915* (2013.01); *F16H 2055/178* (2013.01); *F16H 2063/3093* (2013.01); *F16H 2200/0052* (2013.01)

(58) Field of Classification Search
CPC .................. F16D 2023/0631; F16D 11/14
See application file for complete search history.

(56) References Cited

U.S. PATENT DOCUMENTS

| | | | |
|---|---|---|---|
| 4,096,932 A * | 6/1978 | Liberty, Jr. ............. | F16D 11/10 192/48.91 |
| 4,098,380 A * | 7/1978 | Thomas .................. | F16D 11/10 192/108 |
| 7,770,480 B2 * | 8/2010 | Martin .................... | F16D 23/02 192/48.7 |
| 8,291,784 B2 * | 10/2012 | Martin .................... | F16D 11/10 74/329 |

FOREIGN PATENT DOCUMENTS

| | | |
|---|---|---|
| JP | 2006-525479 A | 11/2006 |
| JP | 2013-210085 A | 10/2013 |
| WO | 2004/099654 A1 | 11/2004 |

* cited by examiner

*Primary Examiner* — Ha Dinh Ho
(74) *Attorney, Agent, or Firm* — Oliff PLC

(57) ABSTRACT

A transmission includes a gear shift set including a shift gear and a switching mechanism, and another gear shift set including a shift gear and a switching mechanism. At a side face of the lower shift gear, dogs are provided to protrude. The switching mechanism includes a first ring configured to rotate integrally with a shaft, a second ring configured to rotate integrally with the first ring, and an elastic member connecting the first ring and the second ring. The first ring includes first projection portions, and a first abutment portion allowing a shift member to abut thereon. The second ring includes second projection portions, and a second abutment portion allowing the shift member to abut thereon.

7 Claims, 15 Drawing Sheets

TRANSMISSION

CROSS-REFERENCE TO RELATED APPLICATIONS

The disclosure of Japanese Patent Application No. 2015-163643 filed on Aug. 21, 2015 including the specification, drawings and abstract is incorporated herein by reference in its entirety.

BACKGROUND

1. Technical Field

The present disclosure relates to a transmission that enables prevention of torque interruption in a gear shift.

2. Description of Related Art

Transmissions that enable prevention of torque interruption in a gear shift. In a transmission disclosed in Published Japanese Translation of PCT Application No. 2006-525479, a shift fork moves disk springs, whereby engagement bar sets move to the shift gear side. Each disk spring includes three arms. In other words, in JP-A-2006-525479, the disk springs and the engagement bar sets are formed of different members, and a driving force of the shift fork is transmitted to the engagement bar sets through the disk springs (the three arms).

In a transmission disclosed in Japanese Patent Application Publication No. 2013-210085, a shift fork moves detent mechanisms, whereby keys move to the shift gear side. Each detent mechanism includes a groove portion formed in the key, a ball disposed in the groove portion, and biasing means for pressing the ball against the groove portion. In other words, in JP 2013-210085 A, the detent mechanisms (the ball and the biasing means) and the keys are formed of different members, and a driving force of the shift fork is transmitted to the keys through the detent mechanisms (the ball and the biasing means).

In the bar sets or the keys, respective engagement portions are formed. A gear shift is made as a result of the bar sets or the keys (engagement portions) moving in an axis direction and the engagement portions engaging with dogs of a shift gear. In the transmissions disclosed in JP-A-2006-525479 and JP 2013-210085 A, the shift fork (shift member) moves the bar sets or the keys via the disk springs or the detent mechanisms. In other words, the transmissions disclosed in JP-A-2006-525479 and JP 2013-210085 A, the shift fork does not directly move the bar sets or the keys with the respective engagement portions formed therein. Thus, there is a delay in movement of the engagement portions relative to movement of the shift fork.

In the transmissions disclosed in JP-A-2006-525479 and JP 2013-210085 A, even if the shift fork is driven when the engagement portions and the dogs are in proper relative positions in a rotation direction, the engagement portions move in retard of the shift fork, which may result in failure of the engagement portions and the dogs to engage with each other properly and thus may result in frequent collision between edges of the engagement portions and edges of the dogs. In other words, a delay of movement of the engagement portions relative to movement of the shift fork causes a gear shift lag due to a retry of engagement or decrease in durability of the engagement portions and the dogs due to frequent collision of these members.

SUMMARY

In view of the above problems, the present disclosure provides a transmission that enables suppressing delay in movement of engagement portions relative to a shift member.

Therefore, an aspect of the present disclosure provides a transmission including a shift gear and a switching mechanism. The shift gear is configured to be rotatably attached to a shaft, and a plurality of dogs are provided to protrude at a side face of the shift gear. The switching mechanism is provided for the shift gear and is configured to switch between a state in which the shift gear and the shaft rotate integrally and a state in which the shift gear and the shaft do not rotate integrally. The switching mechanism includes a first ring, a second ring, an elastic member and a shift member. The first ring is configured to rotate integrally with the shaft. The first ring includes a first projection portion, a communication portion and a first abutment portion, and the first projection portion has a shape extending toward the shift gear in an axis direction of the shaft. The communication portion has a shape extending in the axis direction. The first abutment portion is provided on a side opposite to the shift gear in the axis direction, and the first abutment portion allows the shift member to abut on the first abutment portion. The second ring is configured to rotate integrally with the shaft and rotate integrally with the first ring, and is disposed on the side opposite to the shift gear in the axis direction relative to the first ring. The second ring includes a second projection portion and a second abutment portion, and the second projection portion has a shape extending toward the shift gear in the axis direction and is disposed to extend through an inside of the communication portion of the first ring. The second abutment portion is provided on a side that is the same as the shift gear in the axis direction, and the second abutment portion allows the shift member to abut on the second abutment portion. A configuration is made such that the shift member moves the first ring in a direction closer to the shift gear and the first projection portion engages with a dog from among the plurality of dogs, and the second projection portion is disposed together with the first projection portion between two of the dogs, and when the shift member moves the second ring in a direction away from the shift gear, and the second projection portion is configured to come out from between the two of the dogs while the first projection portion engaging with the dog. The elastic member is configured to connect the first ring and the second ring, the elastic member provides a biasing force making a distance in the axis direction between the first ring and the second ring have a fixed value to the first ring and the second ring using an elastic resilient force of the elastic member. The shift member is configured to provide a force in the axis direction to the first ring and the second ring.

Also, in the transmission, the shift gear and the switching mechanism may make up a gear shift set, and the transmission may include at least two gear shift sets. The gear shift sets includes a gear shift set including at least a lower shift gear, the gear shift set including at least the lower shift gear may include a plurality of dogs provided to protrude at a side face of the shift gear. The first projection portion may have a shape extending toward the lower shift gear in the axis direction. The first abutment portion may be provided on a side opposite to the lower shift gear in the axis direction, and the first abutment portion may allow the shift member to abut on the first abutment portion. The second ring may be disposed on the side opposite to the lower shift gear relative to the first ring. The second abutment portion may be provided on a side that is the same as the lower shift gear in the axis direction, and the second abutment portion may allow the shift member to abut on the second abutment portion. The shift member may move the first ring in a direction closer to the lower shift gear and the first projection portion may engage with a dog from among the dogs, and when the shift member moves the second ring in a direction away from the lower shift gear, the second projection portion may be configured to come out from between two of the dogs while the first projection portion engaging with the dog.

Also, in the transmission, motive power from an engine may be transmitted to the switching mechanism via the shift gear. The first projection portion may include an inclined surface, and the inclined surface may extend further toward a rear side in a rotation direction of the first projection portion as further away from a side face of the first ring in a part on a front side in the rotation direction of the first projection portion.

Also, in the transmission, motive power from an engine may be transmitted to the shift gear via the switching mechanism. The first projection portion may include an inclined surface. The inclined surface may extend further toward a front side in a rotation direction of the first projection portion as further away from a side face of the first ring in a part on a rear side in the rotation direction of the first projection portion.

Also, in the transmission, the first ring may include a first side wall extending in a radial direction, the second ring may include a second side wall extending in the radial direction, and the elastic member may include a pair of holding portions and a connection portion. The pair of holding portions may be configured to hold the first side wall and the second side wall between the pair of holding portions from outside in the axis direction. The connection portion may be provided on an inner side in the radial direction of the pair of holding portions and the connection portion may be configured to connect end portions of the pair of the holding portions.

Also, in the transmission, the first side wall may include the first abutment portion, the first abutment portion may include a surface of the first side wall, the surface of the first side wall being positioned on the side opposite to the lower shift gear in the axis direction, and the shift member may abut on the surface of the first side wall. The second side wall may include the second abutment portion. The second abutment portion may include a surface of the second side wall, the surface of the second side wall being positioned on the side that is the same as the lower shift gear in the axis direction, the shift member may abut on the surface of the second side wall.

Furthermore, in the transmission, the first ring may include a third ring and a fourth ring, and the third ring and the fourth ring may be joined to each other. The third ring may include the first projection portion. The fourth ring may include the first side wall. The second ring may include a fifth ring and a sixth ring, and the fifth ring and the sixth ring may be joined to each other. The fifth ring may include the second projection portion. The sixth ring may include the second side wall.

According to the configuration of the transmission stated above, the first ring includes the first projection portion (engagement portion) configured to engage with a dog and the first abutment portion configured to abut on the shift member. The shift member directly abuts on the first abutment portion of the first ring and thereby moves the first ring in the axis direction of the shaft of the transmission. The shift member directly provides a force required for the movement in the axis direction to the first ring. Since the shift member moves integrally with the first ring, no delay occurs in the first ring in response to movement of the shift member. The engagement portion (first projection portion) of the first ring can be inserted between the dogs of the shift gear at a proper timing by means of movement of the shift member.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
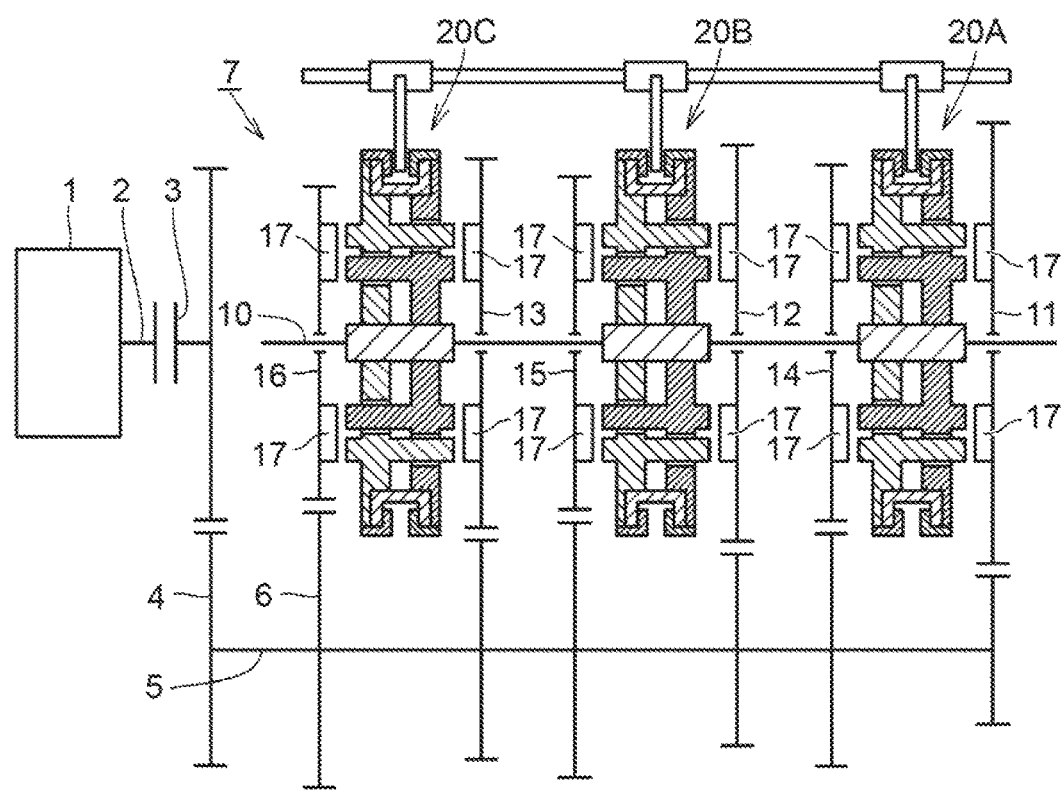
FIG. 1 is a diagram schematically illustrating a transmission according to an embodiment, which is an example of the present disclosure, and a configuration of a periphery thereof.

An embodiment will be described below. Components that are identical or correspond to each other are provided with a same reference numeral, and overlapping descriptions thereof may be omitted. First, a configuration of a transmission will be described with reference to FIGS. 1 to 4. Next, operation of the transmission performed in shifting up from a neutral position to a first gear will be described with reference to FIGS. 5A and 5B to 8A and 8B. Next, operation of the transmission performed in shifting up from the first gear to a second gear will be described with reference to FIGS. 9A and 9B to 13A and 13B.

First, a configuration of a transmission according to an embodiment of the present disclosure will be described. FIG. 1 is a diagram schematically illustrating a transmission and a configuration of a periphery thereof. Referring to FIG. 1, a rotation driving force from an engine 1 is transmitted to a lay shaft (side shaft) 5 through a crankshaft 2, a clutch 3 and a drop gear 4. On the lay shaft 5, six main gears 6 are fixedly provided, and the six main gears 6 rotate integrally with the lay shaft 5. Rotation driving forces from the six main gears 6 are selectively transmitted to the countershaft 10 through a transmission 7 including switching mechanisms 20A to 20C (the details will be described later).

As illustrated in FIG. 1, the transmission 7 includes shift gears 11 to 16, which correspond to first to sixth gears, respectively, and switching mechanisms 20A, 20B, 20C. The shift gears 11 to 16 are rotatably attached to the countershaft 10. Each of the switching mechanisms 20A, 20B, 20C includes a shift member 70 (see FIG. 2).

A selection from the shift gears 11 to 16 is determined according to positions of the respective shift members 70 (more specifically, respective fork portions 72) provided in the switching mechanism 20A, 20B, 20C. The positions of the respective shift members 70 (fork portions 72) are determined according to operation of a shift lever by a driver.

The switching mechanism 20A is disposed between the shift gears 11, 14. At each of respective side faces of the shift gears 11, 14, the side faces facing the switching mechanism 20A, dogs 17 are provided to protrude. The switching mechanism 20B is disposed between the shift gears 12, 15. At each of respective side faces of the shift gears 12, 15, the side faces facing the switching mechanism 20B, also, dogs 17 are provided to protrude. The switching mechanism 20C is disposed between the shift gears 13, 16. At respective side faces of the shift gears 13, 16, the side faces facing the switching mechanism 20C, dogs 17 are provided to protrude. Each of a front face and a rear face in a rotation direction of the dogs 17 has a flat shape extending along a radial direction (see the dogs 17 of the shift gear 11 illustrated in FIGS. 3 and 5B).

Although the details will be described later, the switching mechanism 20A switches between a state in which the shift gear 11 and the countershaft 10 rotate integrally and a state in which the shift gear 11 and the countershaft 10 do not rotate integrally, in response to movement of the shift member 70 (the fork portion 72). The switching mechanism 20A also can switch between a state in which the shift gear 14 and the countershaft 10 rotate integrally and a state in which the shift gear 14 and the countershaft 10 do not rotate integrally, in response to movement of the shift member 70 (the fork portion 72).

The switching mechanism 20B switches between a state in which the shift gear 12 and the countershaft 10 rotate integrally and a state in which the shift gear 12 and the countershaft 10 do not rotate integrally, in response to movement of the shift member 70 (the fork portion 72). The switching mechanism 20B also can switch between a state in which the shift gear 15 and the countershaft 10 rotate integrally and a state in which the shift gear 15 and the countershaft 10 do not rotate integrally, in response to movement of the shift member 70 (the fork portion 72).

The switching mechanism 20C switches between a state in which the shift gear 13 and the countershaft 10 rotate integrally and a state in which the shift gear 13 and the countershaft 10 do not rotate integrally, in response to movement of the shift member 70 (the fork portion 72). The switching mechanism 20C also can switch between a state in which the shift gear 16 and the countershaft 10 rotate integrally and a state in which the shift gear 16 and the countershaft 10 do not rotate integrally, in response to movement of the shift member 70 (the fork portion 72).

Figure 2:
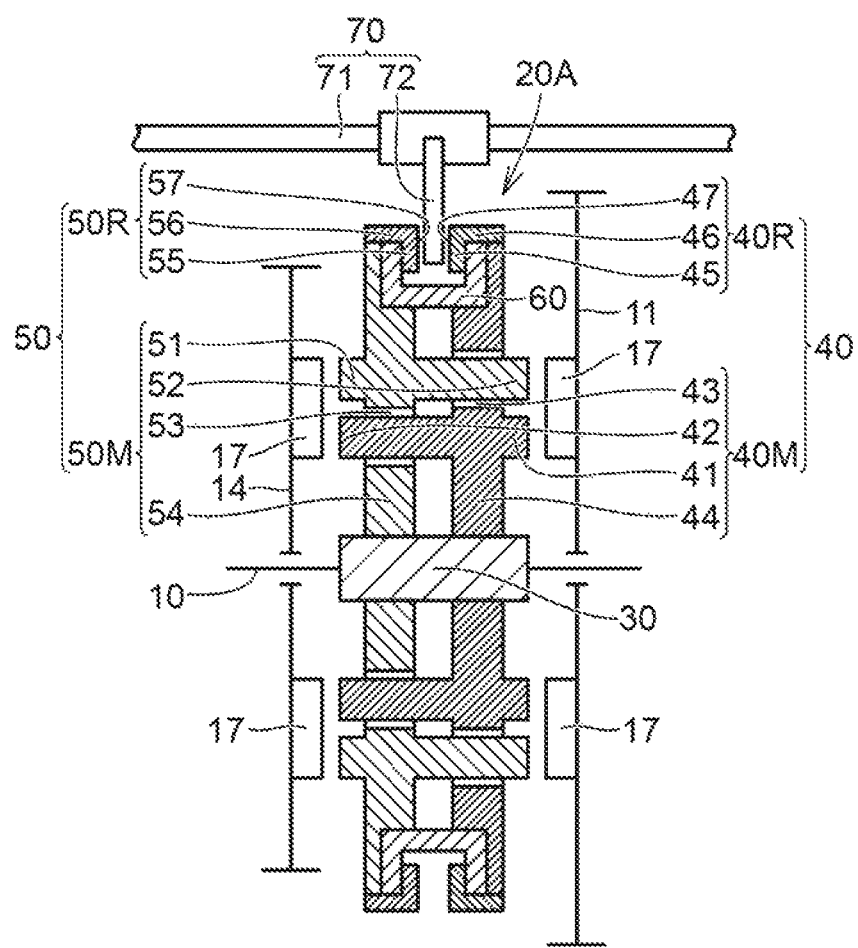
FIG. 2 is an enlarged view of a switching mechanism in FIG. 1.
Figure 3:
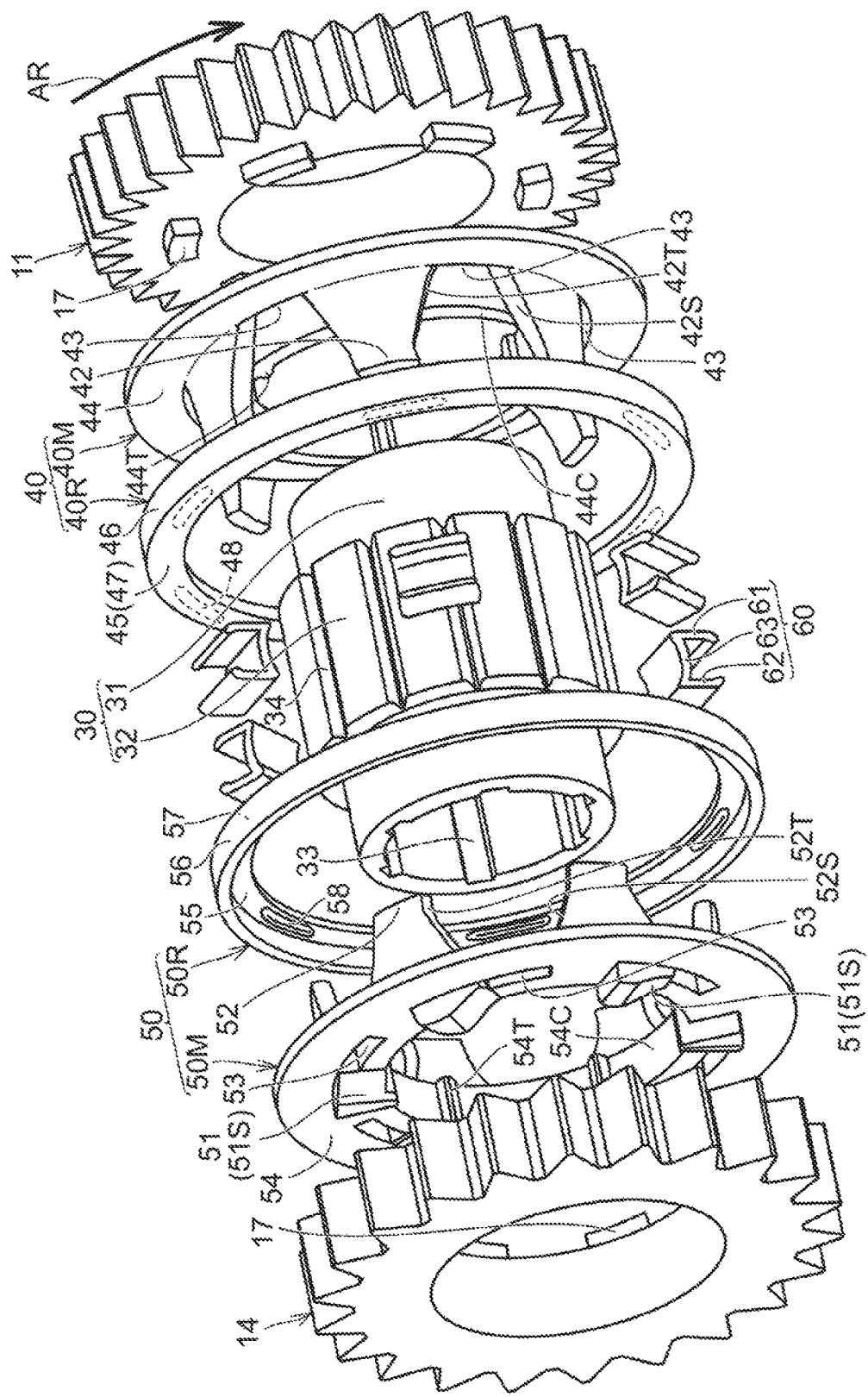
FIG. 3 is a perspective exploded view of a switching mechanism and shift gears included in the transmission according to the present embodiment.
Figure 4:
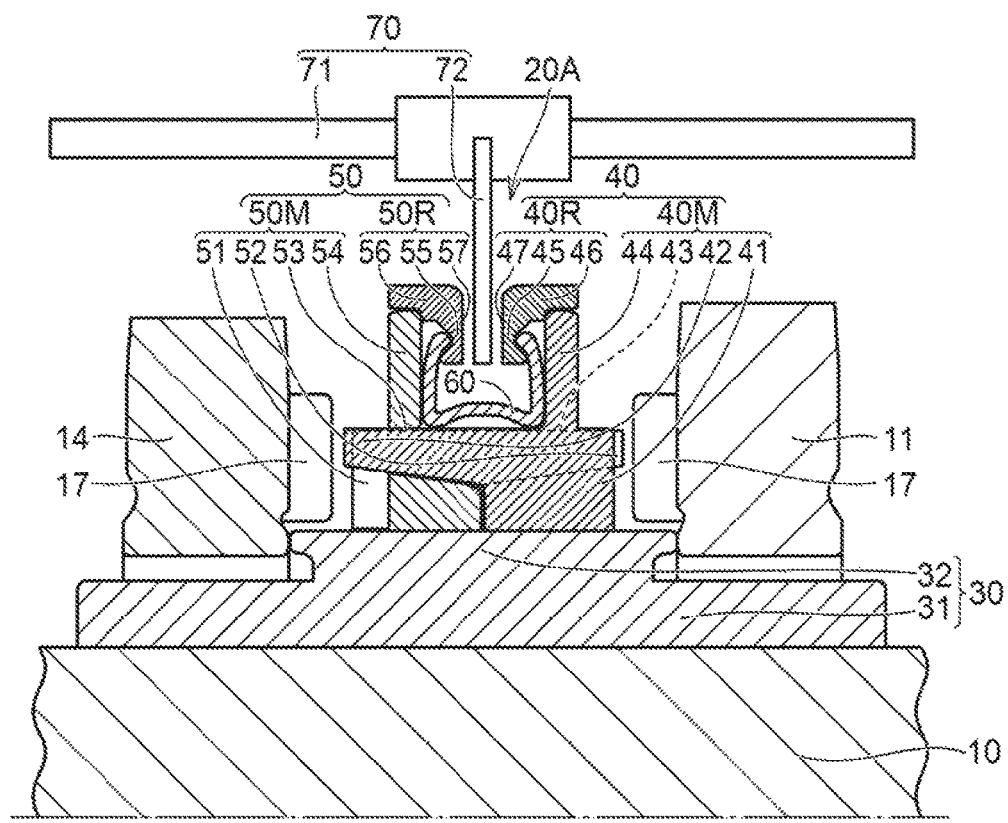
FIG. 4 is a cross-sectional view of the switching mechanism and the shift gears included in the transmission.

FIG. 2 is an enlarged view of the switching mechanism 20A in FIG. 1. FIG. 3 is a perspective exploded view of the switching mechanism 20A and the shift gears 11, 14 included in the transmission. FIG. 4 is a cross-sectional view of the switching mechanism 20A and the shift gears 11, 14 included in the transmission. The switching mechanism 20A will be described below with reference to FIGS. 2 to 4. Since the switching mechanisms 20B, 20C each have a configuration that is identical to that of the switching mechanism 20A, no repetitive description thereof will be provided.

As illustrated in FIGS. 2 to 4, the switching mechanism 20A includes a sleeve 30, a first ring 40, a second ring 50, elastic members 60 and the shift member 70. These components will be described in sequence below.

Mainly referring to FIG. 3, the sleeve 30 includes a cylindrical portion 31 and an outer peripheral portion 32. In FIG. 4, the cylindrical portion 31 and the outer peripheral portion 32 are illustrated in an integrated manner (the same applies to, e.g., FIG. 5A, which will be described later). The cylindrical portion 31 has a shape extending in an axis direction (a countershaft axis direction). In an inner peripheral face of the cylindrical portion 31, recessed portions 33 (FIG. 3) extending in the axis direction are provided. The outer peripheral portion 32 is provided to surround the cylindrical portion 31. In a surface of the outer peripheral portion 32, recessed portions 34 extending in the axis direction are provided.

Respective shapes of the inner peripheral face and the recessed portion 33 of the sleeve 30 (cylindrical portion 31) correspond to a shape of an outer peripheral face of the countershaft 10. Accordingly, in a state in which the sleeve 30 is disposed around the countershaft 10, the sleeve 30 rotates integrally with the countershaft 10. A position in the axis direction of the sleeve 30 relative to that of the countershaft 10 is limited by non-illustrated fixing means (e.g., a rocknut or a collar). In a gear shift, even if the shift member 70 (the fork portion 72) moves the first ring 40 or the second ring 50 in the axis direction, the sleeve 30 is prevented from moving in the axis direction.

Referring to FIGS. 2 to 4, the first ring 40 includes a dog ring 40M (third ring) provided with first projection portions 41 and a fork ring 40R (fourth ring) provided with a first side wall 45. In FIGS. 1 and 2, the dog ring 40M and the fork ring 40R are schematically illustrated.

The dog ring 40M and the fork ring 40R are joined to each other via a non-illustrated adhesive or welding, and rotate integrally. Although the details will be described later, the dog ring 40M and the fork ring 40R of the first ring 40 have respective shapes that are substantially identical (mirror-symmetrical) to those of a dog ring 50M and a fork ring 50R of the second ring 50 (see FIG. 3).

The dog ring 40M of the first ring 40 includes a body 44 (FIG. 3), a cylindrical portion 44C (FIG. 3), first projection portions 41 (FIGS. 2 and 4), projection portions 42 (FIGS. 2 to 4) and communication portions 43. These components of the dog ring 40M correspond to a body 54 (FIG. 3), a cylindrical portion 54C (FIG. 3), projection portions 51 (see FIG. 3), second projection portions 52 (FIGS. 2 to 4) and communication portions 53 in the dog ring 50M of the second ring 50, respectively.

In the dog ring 40M, the body 44 has an annular shape (also see the body 54 of the dog ring 50M illustrated in FIG. 3). The cylindrical portion 44C, which is provided on the inner side of the body 44, has a shape extending from a position on the inner side of the body 44 toward the shift gear 14 side in the axis direction (also see the cylindrical portion 54C of the dog ring 50M illustrated in FIG. 3).

The cylindrical portion 44C of the first ring 40 is disposed around the outer peripheral portion 32 of the sleeve 30. On the inner side of the cylindrical portion 44C, projection portions 44T (FIG. 3) extending in the axis direction are provided. A shape of the projection portions 44T corresponds to a shape of the recessed portions 34 provided in the outer peripheral portion 32 of the sleeve 30. Accordingly, in a state in which the first ring 40 is disposed around the sleeve 30 (outer peripheral portion 32), the first ring 40 rotates integrally with the sleeve 30 and the countershaft 10.

At the first ring 40, six first projection portions 41 (FIGS. 2 and 4) are provided. The first projection portions 41 have a shape extending in the axis direction (protruding in the axis direction) from a face of the body 44, the face facing the shift gear 11, toward the shift gear 11 (lower shift gear) side (also see the projection portions 51 of the dog ring 50M illustrated in FIG. 3).

Figure 5A:
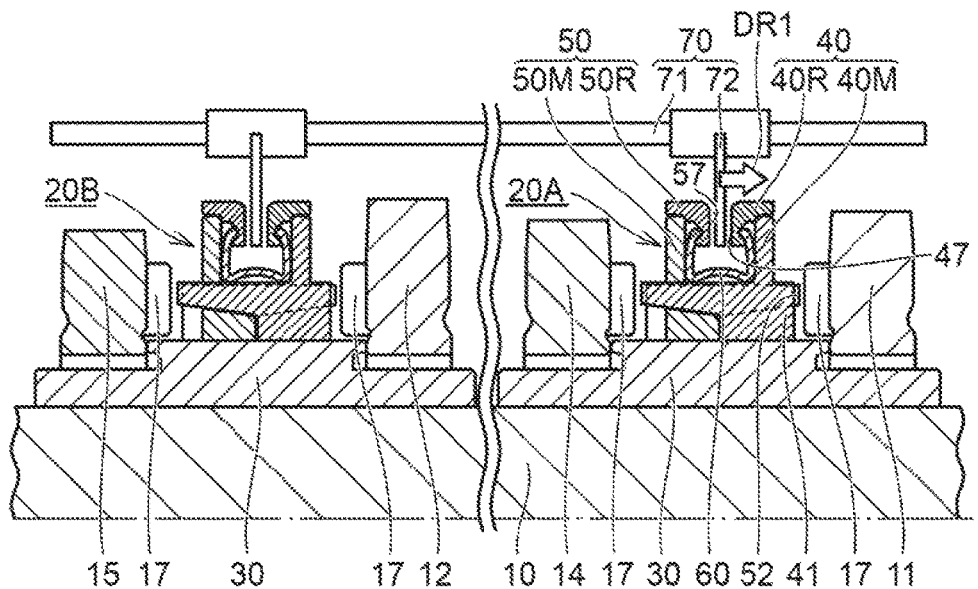
FIG. 5A is a cross-sectional view of shift gears and switching mechanisms, etc., of the transmission according to the present embodiment in a state in which a first ring and a second ring of each switching mechanism are not engaged with a shift gear (neutral position)
Figure 5B:
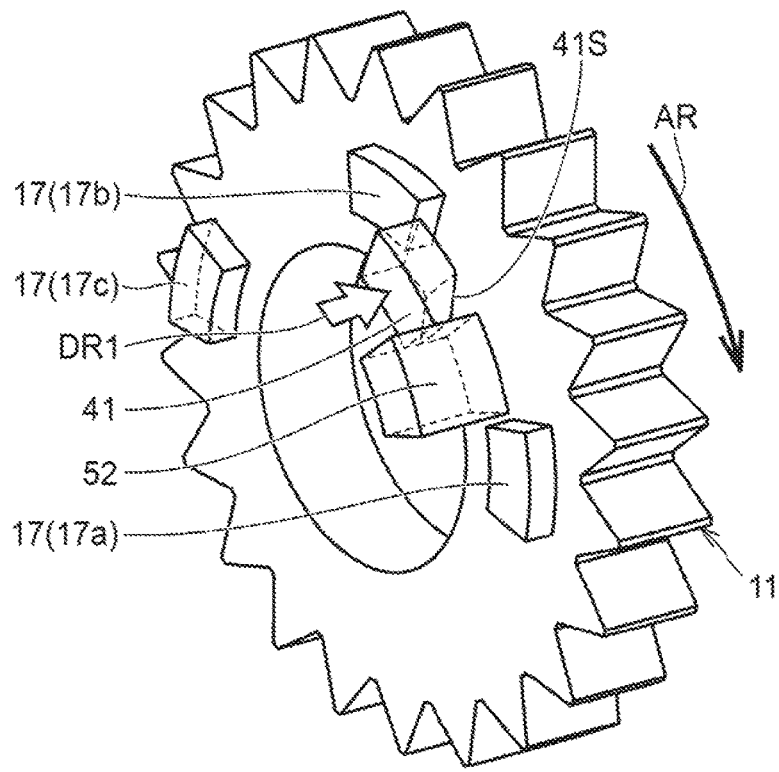
FIG. 5B is a perspective view of a shift gear, a first projection portion and a second projection portion according to FIG. 5A.

A part on the front side in a rotation direction (arrow AR) of a surface of each first projection portion 41 extends obliquely relative to a side face of the first ring 40 (body 44) (see FIG. 5B). More specifically, at the part on the front side in the rotational direction (arrow AR) of each first projection portion 41, an inclined surface 41S extending further toward the rear side in the rotation direction as further away from the side face of the first ring 40 (body 44) is formed. In FIG. 5B, for ease of illustration, the body 44 of the first ring 40 and the body 54 of the second ring 50 are not illustrated, but only a first projection portion 41 of the first ring 40 and a second projection portion 52 of the second ring 50 are illustrated.

On the other hand, a part on the rear side in the rotation direction (arrow AR) of each first projection portion 41 is perpendicular to a face of the first ring 40 (body 44), the face facing the shift gear 11 (see FIG. 5B), and has a flat plane shape extending in the radial direction of the first ring 40 (body 44). Since each first projection portion 41 has the aforementioned shape, a width in a circumferential direction (rotation direction) of each first projection portion 41 gradually decreases as further away from the side face of the first ring 40 (body 44) in the axis direction (as closer to the dogs 17 of the shift gear 11) (also see the projection portions 51 of the dog ring 50M illustrated in FIG. 3). The first projection portions 41 of the first ring 40 move close to the shift gear 11 and rear end portions in the rotation direction of the first projection portions 41 engage with the dogs 17 of the shift gear 11, whereby the first ring 40 can rotate integrally with the shift gear 11, together with the second ring 50 (see FIG. 8B).

At the first ring 41), six projection portions 42 (FIG. 3) are also provided. The projection portions 42, which are each formed in a trapezoidal shape, have a shape tapering toward the shift gear 14 side with a position on the inner side of the body 44 (a position on the outer side of the cylindrical portion 44C) as a starting point (also see the second projection portions 52 of the dog ring 50M illustrated in FIG. 3). Each projection portions 42 of the first ring 40 is disposed to extend through a part between a front edge portion 52T (FIG. 3) provided on the front side in the rotation direction of a second projection portion 52 of the second ring 50 and a rear edge portion 52S provided on the rear side in the rotation direction of the second projection portion 52 and further through the inside of a communication portion 53 provided in the second ring 50 (also see FIG. 2).

Six communication portions 43 provided in the first ring 40 each have a shape extending in the axis direction (also see the communication portions 53 of the dog ring 50M illustrated in FIG. 3). Each communication portion 43 extends through a part of the body 44 in the axis direction and is formed at a position surrounded by an outer peripheral face of the cylindrical portion 44C, a front edge portion 42T provided on the front side in the rotation direction of a projection portion 42 and a rear edge portion 42S on the rear side in the rotational direction of a projection portion 42. Each second projection portion 52 of the second ring 50 is disposed to extend through a part between a front edge portion 42T (FIG. 3) provided on the front side in the rotation direction of a projection portion 42 of the first ring 40 and a rear edge portion 42S provided on the rear side in the rotation direction of a projection portion 42 of the first ring 40 and further through the inside of a communication portion 43 provided in the first ring 40 (also see FIG. 2).

Referring to FIGS. 2 to 4, as described above, the fork ring 40R of the first ring 40 has a shape that is substantially identical (mirror-symmetrical) to that of the fork ring 50R of the second ring 50. The fork ring 40R in the present embodiment includes the first side wall 45 and an outer peripheral portion 46. The first side wall 45, which is formed in an annular shape, has a thin plate-like shape extending along the radial direction (FIG. 3). In a surface of the first side wall 45 positioned on the shift gear 11 side in the axis direction, six recessed portions 48 (FIG. 3) to be engaged with the elastic members 60 are provided. The outer peripheral portion 46 is provided at an outer side end in the radial direction of the first side wall 45. A part on the outer peripheral side of the dog ring 40M (body 44) is joined to a part on the inner peripheral side of the outer peripheral portion 46.

Here, the first ring 40 includes a first abutment portion 47 provided on the side opposite to the lower shift gear 11 in the axis direction and allows the shift member 70 (fork portion 72) to abut thereon. The first abutment portion 47 has a flat surface shape and extends annularly along the circumferential direction. In the present embodiment, a surface of the first side wall 45 positioned on the side opposite to the lower shift gear 11 in the axis direction forms the first abutment portion 47. The first abutment portion 47 is a part that allows the shift member 70 (fork portion 72) to directly abut thereon.

Referring to FIGS. 2 to 4, the second ring 50 is disposed on the side opposite to the lower shift gear 11 relative to the first ring 40 in the axis direction. The second ring 50 includes the dog ring 50M (fifth ring) provided with the second projection portions 52 and the fork ring 50R (sixth ring) provided with a second side wall 55. In FIGS. 1 and 2, the dog ring 50M and the fork ring 50R are schematically illustrated.

The dog ring 50M and the fork ring 50R are joined to each other via a non-illustrated adhesive or welding, and rotate integrally. As described above, the dog ring 50M and the fork ring 50R of the second ring 50 have respective shapes that are substantially identical to those of the dog ring 40M and the fork ring 40R of the first ring 40, respectively (see FIG. 3).

Mainly referring to FIG. 3, the dog ring 50M of the second ring 50 includes the body 54, the cylindrical portion 54C, the projection portions 51, the second projection portions 52 and the communication portions 53. The body 54 has an annular shape. The cylindrical portion 54C, which is provided on the inner side of the body 54, has a shape extending from a position on the inner side of the body 54 toward the shift gear 11 side in the axis direction.

The cylindrical portion 54C of the second ring 50 is disposed around the outer peripheral portion 32 of the sleeve 30. On the inner side of the cylindrical portion 54C, projection portions 54T extending in the axis direction are provided. A shape of the projection portions 54T corresponds to the shape of the recessed portions 34 provided in the outer peripheral portion 32 of the sleeve 30. Accordingly, in a state in which the second ring 50 is disposed around the sleeve 30 (outer peripheral portion 32), the second ring 50 rotates integrally with the sleeve 30, the countershaft 10 and the first ring 40. Also, the first ring 40 and the second ring 50 can move relative to each other in the axis direction.

At the second ring 50, six projection portions 51 are provided. The projection portions 51 have a shape extending in the axis direction (protruding in the axis direction) from a face of the body 54, the face facing the shift gear 14, toward the shift gear 14 side. A part on the front side in the rotation direction (arrow AR) of each projection portion 51 extends obliquely relative to a side face of the second ring 50 (body 54). More specifically, at the part on the front side in the rotation direction (arrow AR) of each projection portion 51, an inclined surface 51S extending further toward the rear side in the rotation direction as further away from the side face of the second ring 50 (body 54) is formed.

On the other hand, a part on the rear side in the rotation direction (arrow AR) of each projection portion 51 is perpendicular to a face of the second ring 50 (body 54), the face facing the shift gear 14, and has a flat plane shape extending in the radial direction of the second ring 50 (body 54). Since each projection portion 51 has the aforementioned shape, a width in the circumferential direction (rotation direction) of each projection portion 51 gradually decreases as further away from the side face of the second ring 50 (body 54) in the axis direction (as closer to the dogs 17 of the shift gear 14). The projection portions 51 of the second ring 50 move to come close to the shift gear 14 and rear end portions in the rotation direction of the projection portions 51 engage with the dogs 17 of the shift gear 14, whereby the second ring 50 can rotate integrally with the shift gear 14, together with the first ring 40.

At the second ring 50, six second projection portions 52 are also provided. The second projection portions 52, which are each formed in a trapezoidal shape, have a shape tapering toward the lower shift gear 11 side with a position on the inner side of the body 54 (a position on the outer side of the cylindrical portion 54C) as a starting point. As described above, each second projection portion 52 of the second ring 50 is disposed to extend through a part between a front edge portion 42T provided on the front side in the rotation direction of a projection portion 42 of the first ring 40 and a rear edge portion 42S provided on the rear side in the rotation direction of a projection portion 42 and further through the inside of a communication portion 43 provided in the first ring 40 (also see FIG. 2).

Six communication portions 53 provided in the second ring 50 each have a shape extending in the axis direction. Each communication portion 53 extends through a part of the body 54 in the axis direction and is formed at a position surrounded by an outer peripheral face of the cylindrical portion 54C, a front edge portion 52T provided on the front side in the rotation direction of a second projection portion 52 and a rear edge portion 52S provided on the rear side in the rotation direction of a second projection portion 52. Each projection portion 42 of the first ring 40 is disposed to extend through a part between a front edge portion 52T provided on the front side in the rotation direction of a second projection portion 52 of the second ring 50 and a rear edge portion 52S provided on the rear side in the rotation direction of the second projection portion 52 of the second ring 50 and further through the inside of a communication portion 53 provided in the second ring 50 (also see FIG. 2).

Referring to FIGS. 2 to 4, as described above, the fork ring 50R of the second ring 50 has a shape that is substantially identical (mirror-symmetrical) to that of the fork ring 40R of the first ring 40. The fork ring 50R in the present embodiment includes the second side wall 55 and an outer peripheral portion 56. The second side wall 55, which is formed in an annular shape, has a thin plate shape-like extending along the radial direction (FIG. 3). In a surface of the second side wall 55 positioned on the shift gear 14 side in the axis direction, six recessed portions 58 (FIG. 3) to be engaged with the elastic members 60 are provided. The outer peripheral portion 56 is provided at an outer side end in the radial direction of the second side wall 55. A part on the outer peripheral side of the dog ring 50M (body 54) is joined to a part on the inner peripheral side of the outer peripheral portion 56.

Here, the second ring 50 includes a second abutment portion 57 provided on the side that is the same as the lower shift gear 11 in the axis direction and allows the shift member 70 (fork portion 72) to abut thereon. The second abutment portion 57 has a flat surface shape and extends annularly along the circumferential direction. In the present embodiment, a surface of the second side wall 55 positioned on the side that is the same as the lower shift gear 11 in the axis direction forms the second abutment portion 57. The second abutment portion 57 is a part that allows the shift member 70 (fork portion 72) to directly abut thereon.

Mainly referring to FIG. 3, the elastic members 60 connect the first ring 40 and the second ring 50. The elastic members 60 provide a biasing force that makes a distance in the axis direction between the first ring 40 and the second ring 50 have a fixed value, to the first ring 40 and the second ring 50 using an elastic resilient force which the elastic members 60 have.

Each elastic member 60 in the present embodiment includes a pair of holding portions 61, 62 and a connection portion 63. The paired holding portions 61, 62 hold the first side wall 45 of the first ring 40 and the second side wall 55 of the second ring 50 therebetween from the outside in the axis direction. More specifically, the holding portions 61 are disposed to engage with the respective recessed portions 48 of the first ring 40 (fork ring 40R), and the holding portions 62 are disposed to engage with the respective recessed portions 58 of the second ring 50 (fork ring 50R). Each connection portion 63 is provided on the inner side in the radial direction of the pair of holding portions 61, 62 and connects end portions of the paired holding portions 61, 62.

Referring to FIGS. 2 and 4, the shift member 70 includes a shaft portion 71 and a fork portion 72. For ease of illustration, the shift member 70 is not illustrated in FIG. 3. The shaft portion 71 extends in a direction parallel to the axis direction (countershaft axis direction). The shaft portion 71 is a member shared by the respective shift members 70 of the switching mechanisms 20A, 20B, 20C (see FIG. 1).

The fork portion 72 is disposed between the fork ring 40R (the first abutment portion 47) and the fork ring 50R (the second abutment portion 57), and moves along a direction in which the shaft portion 71 extends. Although the details will be described later, the fork portion 72 provides a force in the axis direction to the first ring 40 and the second ring 50.

Next, operation of the transmission performed in shifting-up will be described. Operation of the transmission 7 performed in shifting up from a neutral position to the first gear will be described with reference to FIGS. 5A and 5B to FIGS. 8A and 8B.

FIG. 5A is a cross-sectional view of shift gears 11, 12 and switching mechanisms 20A, 20B, etc., of the transmission 7. The first rings 40 and the second rings 50 of the switching mechanisms 20A, 20B are not engaged with the respective shift gears 11, 12 (neutral position). FIG. 5B is a perspective view of the shift gear 11, a first projection portion 41 and a second projection portion 52 according to FIG. 5A. In FIG. 5B, for ease of illustration, the body 44 of the first ring 40 and the body 54 of the second ring 50 are not illustrated, and only a first projection portion 41 of the first ring 40 and a second projection portion 52 of the second ring 50 are illustrated.

Referring to FIGS. 5A and 5B, in the neutral position (and in the case of the present embodiment in which the shift gear 11 is the driving side, that is, motive power from the engine is transmitted to the switching mechanisms via the shift gears 11 to 16), the first rings 40 and the second rings 50 do almost or totally not rotate. The first projection portions 41 and the second projection portions 52 are disposed at respective positions roughly adjacent to each other in the rotation direction. On the other hand, the shift gears 11, 12 are rotating as a result of receiving the motive power from the engine (see FIG. 1).

In shifting up from the neutral position to the first gear (shift gear 11), the shift member 70 (fork portion 72) of the switching mechanism 20A moves in a direction closer to the lower shift gear 11 (arrow DR1 direction). The fork portion 72 comes close to the fork ring 40R of the first ring 40 and finally abuts on the fork ring 40R (first abutment portion 47).

After the fork portion 72 abutting on the fork ring 40R (first abutment portion 47) of the first ring 40, the fork portion 72 still continues moving in the arrow DR1 direction. The fork portion 72 moves the first ring 40 to such direction. A drive force provided from the fork portion 72 to the first ring 40 is transmitted also to the second ring 50 via the elastic members 60.

Figure 6A:
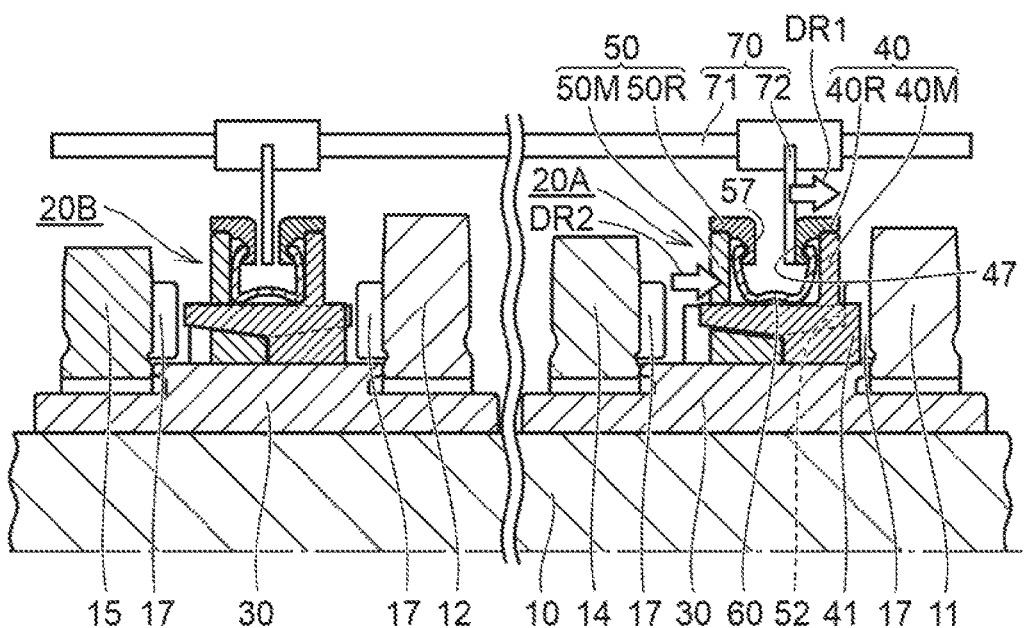
FIG. 6A is a cross-sectional view of the shift gears and the switching mechanisms of the transmission when a first ring (first projection portions) of a switching mechanism reaches a position between dogs of a shift gear.
Figure 6B:
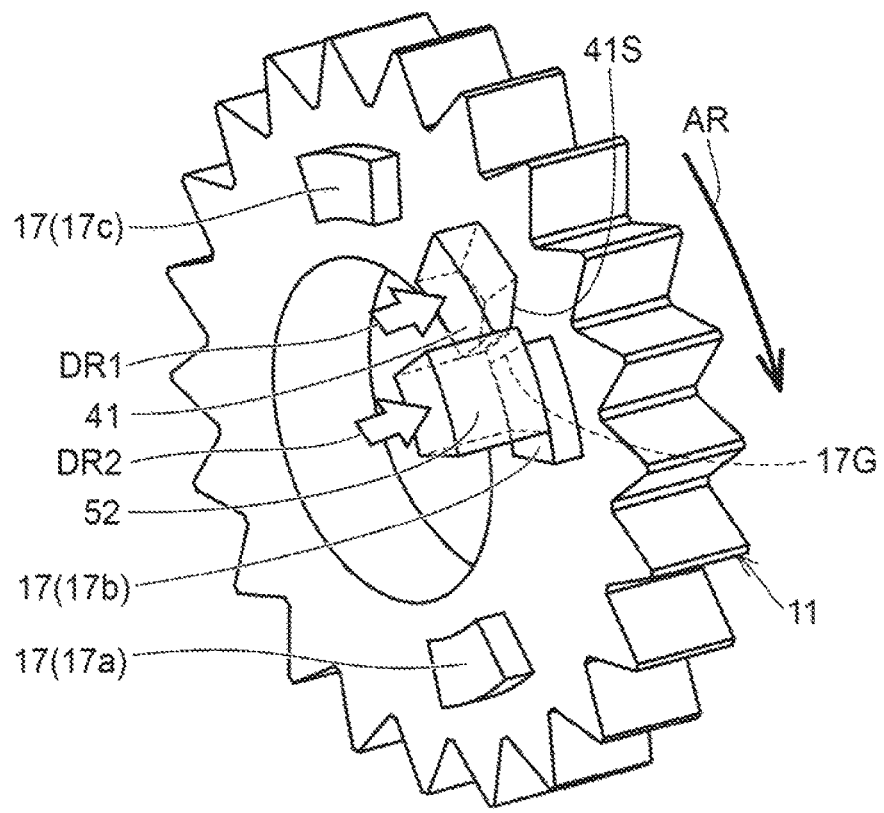
FIG. 6B is a perspective view of a shift gear, a first projection portion and a second projection portion corresponding to FIG. 6A.

Referring to FIGS. 6A and 6B, here, the shift member 70 (fork portion 72) directly abuts on the first abutment portion 47 of the first ring 40 and thereby moves the first ring 40 in the axis direction. The shift member 70 provides a force required for the movement in the axial direction, directly to the first ring 40. Since the shift member 70 moves integrally with the first ring 40 in the arrow DR1 direction, no delay occurs in the first ring 40 in response to movement of the shift member 70. Movement of the shift member 70 (the fork portion 72) enables the engagement portions (the first projection portions 41) of the first ring 40 to be inserted between the respective dogs 17 (17b, 17c) of the shift gear 11 at a proper timing.

The shift member 70 (fork portion 72) continues providing the drive force in the arrow DR1 direction to the first projection portions 41 of the first ring 40, and the first projection portions 41 finally reach respective positions between the dogs 17, 17. In this case, as illustrated in FIG. 6B, there may be cases where only the first projection portions 41 reach the respective positions between the dogs 17, 17 and the second projection portions 52 face the respective dogs 17 (17b). In such cases, the second projection portions 52 are blocked by the dogs 17 (17b) and do not move in the axis direction (the arrow DR2 direction). The elastic members 60 enter an axially-extended state.

Figure 7A:
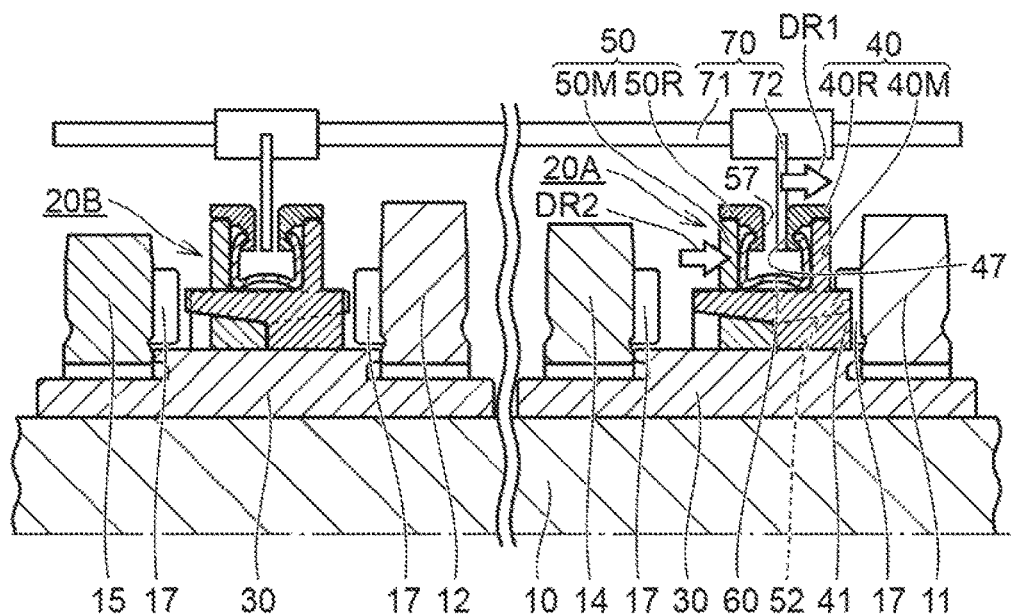
FIG. 7A is a cross-sectional view of the shift gears and the switching mechanisms of the transmission when the first ring (first projection portions) and a second ring (second projection portions) of the switching mechanism reach a position between dogs 17, 17 of the shift gear 11.
Figure 7B:
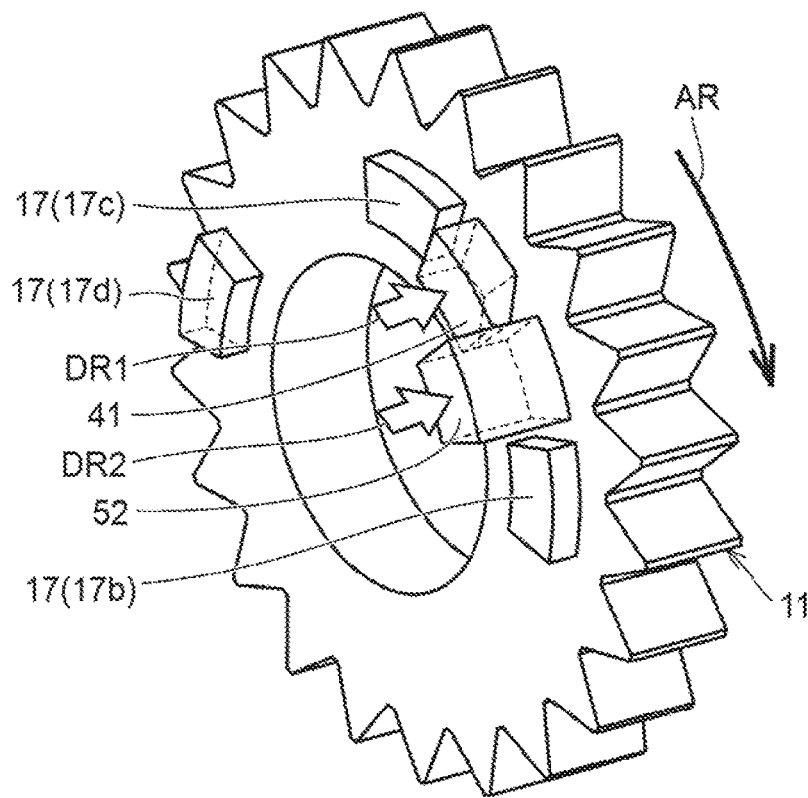
FIG. 7B is a perspective view of a shift gear, a first projection portion and a second projection portion corresponding to FIG. 7A.

Referring to FIGS. 7A and 7B, the shift gear 11 continues rotating relative to the first projection portions 41 and the second projection portions 52. The shift gear 11 further rotates relative to the first projection portions 41 and the second projection portions 52, and finally, the dogs 17 (17b) are made not to face the second projection portions 52 (are made not to block movement in the axis direction of the second projection portions 52). The fork portion 72 continues maintaining the state in which the first projection portions 41 have moved in the arrow DR1 direction. Such disposition of the first projection portions 41 provides a drive force in an arrow DR2 direction to the second projection portions 52 via the elastic members 60. The second projection portions 52 finally moves in such direction, and each second projection portion 52 is thus disposed between two dogs 17, 17 together with the relevant first projection portion 41 (the state illustrated in FIGS. 7A and 7B is achieved). Depending on the timing of starting the gear shift, the state illustrated in FIGS. 5A and 5B may transit directly to the state illustrated in FIGS. 7A and 7B.

Figure 8A:
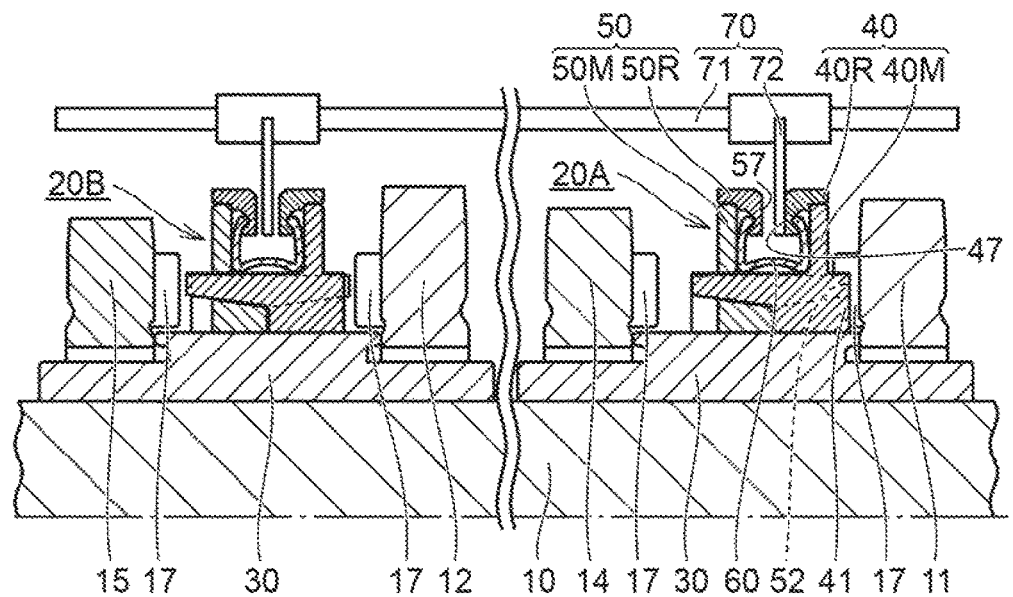
FIG. 8A is a cross-sectional view of the shift gears and the switching mechanisms of the transmission when the first ring (first projection portions) of the switching mechanism engages with the dogs of the shift gear.
Figure 8B:
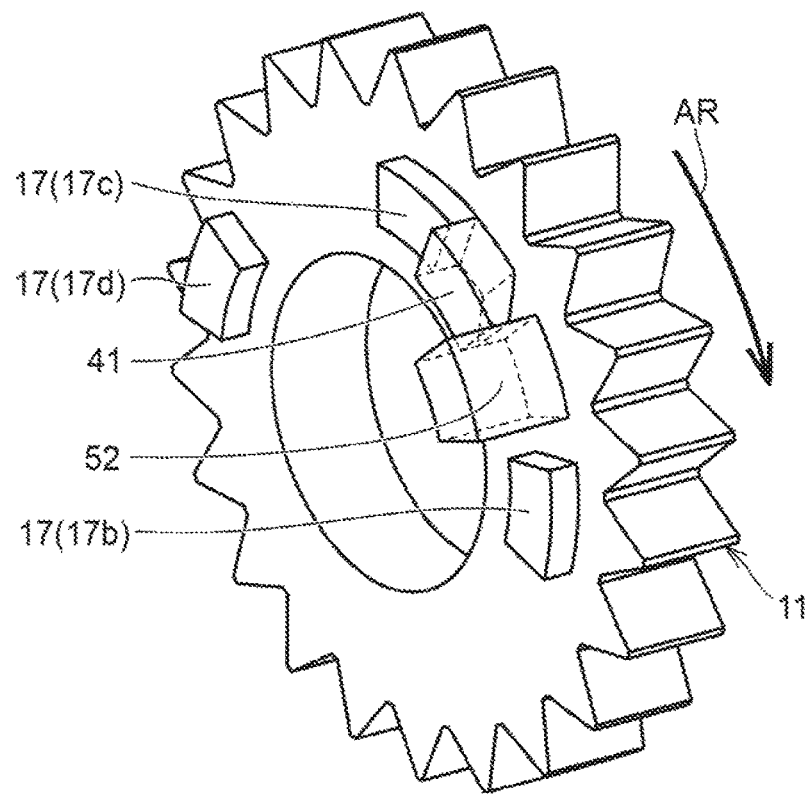
FIG. 8B is a perspective view of a shift gear, a first projection portion and a second projection portion corresponding to FIG. 8A.

Referring to FIGS. 8A and 8B, as a result of the shift gear 11 rotating in the arrow AR direction, the dogs 17 (17c) come close to the respective first projection portions 41 positioned on the front side in the rotation direction of the respective dogs 17 (17c), and the dogs 17 (17c) finally engage with the first projection portions 41. The state illustrated in FIGS. 8A and 8B is thus achieved. As a result of the first projection portions 41 engaging with the dogs 17 of the shift gear 11, the shift gear 11, the first ring 40 and the second ring 50 can rotate integrally with the countershaft 10. Thus, the shifting-up to the first gear (shift gear 11) is completed, and a rotation driving force of the shift gear 11 is transmitted to the countershaft 10 through the switching mechanism 20A.

Figure 9A:
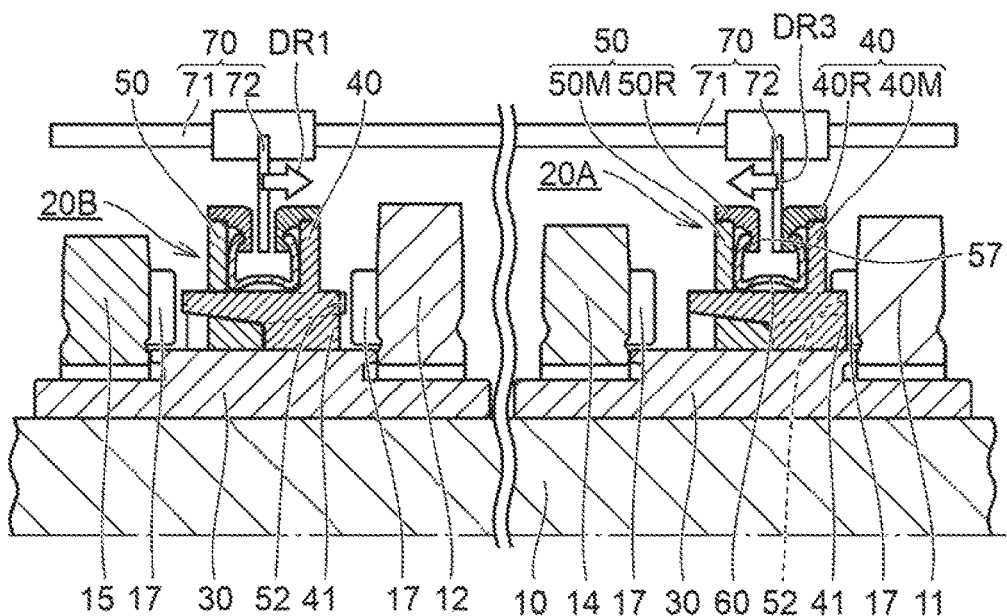
FIG. 9A is a cross-sectional view of the shift gears and the switching mechanisms of the transmission when the second ring 50 (second projection portions 52) of the switching mechanism 20A starts moving out of the position between the dogs 17, 17 of the shift gear 11.
Figure 9B:
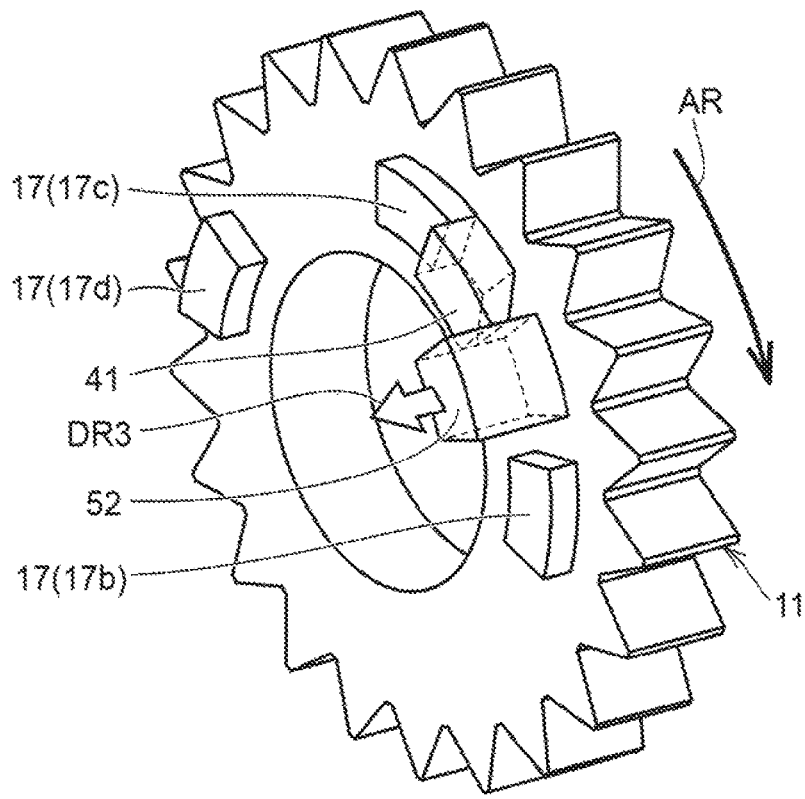
FIG. 9B is a perspective view of the shift gear 11, a first projection portion 41 and a second projection portion 52 corresponding to FIG. 9A.

Shifting-up from the first gear to the second gear will be described below. Referring to FIGS. 9A and 9B, in shifting up from the first gear to the second gear (shift gear 12), the shift member 70 (the fork portion 72) of the switching mechanism 20B moves in an arrow DR1 direction (FIG. 9A) and the shift member 70 (the fork portion 72) of the switching mechanism 20A moves in an arrow DR3 direction (FIG. 9A). In the present embodiment, the shifting-up from the first gear to the second gear is performed by a lower gear shift set including the shift gear 11 and the switching mechanism 20A and a higher gear shift set including the shift gear 12 and the switching mechanism 20B.

Figure 10A:
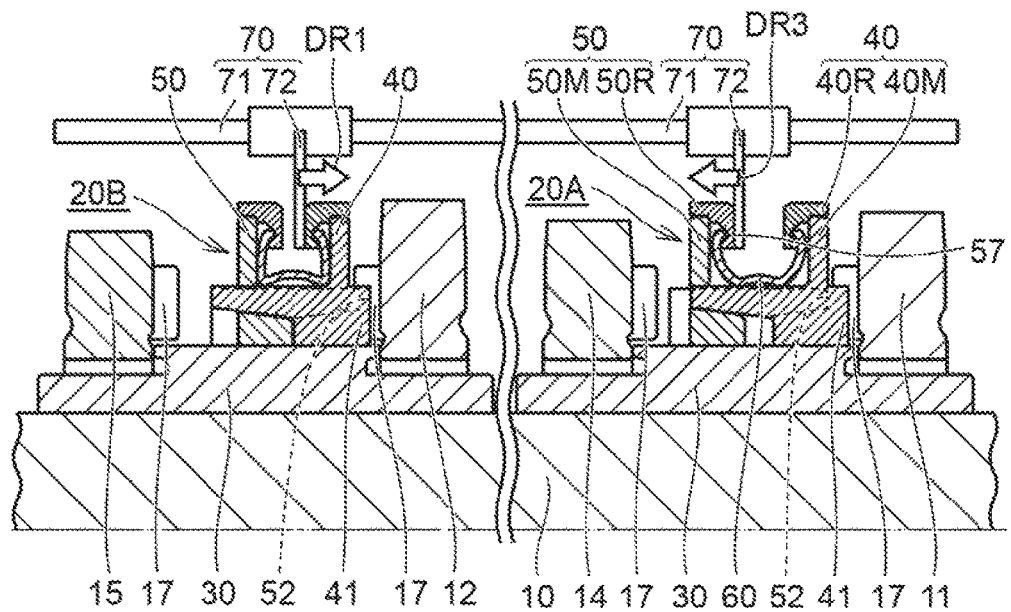
FIG. 10A is a cross-sectional view of the shift gears and the switching mechanisms of the transmission when the second ring 50 (second projection portions 52) of the switching mechanism 20A has moved out of the position between the dogs 17, 17 of the shift gear 11.
Figure 10B:
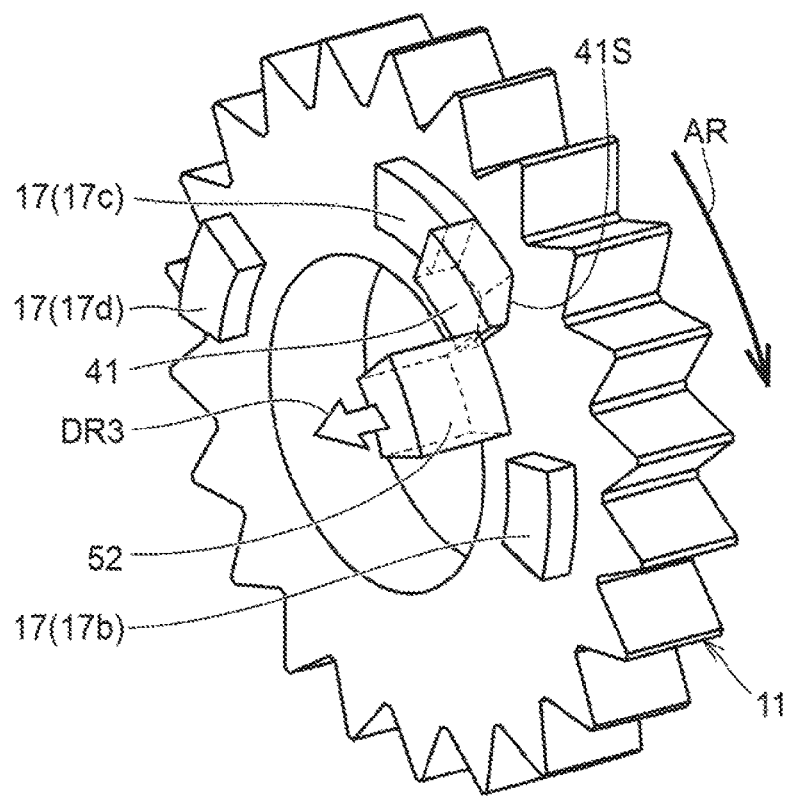
FIG. 10B is a perspective view of the shift gear 11, a first projection portion 41 and a second projection portion 52 according to FIG. 10A.

Referring to FIGS. 10A and 10B, in the switching mechanism 20B, the fork portion 72 moves the first ring 40 in the arrow DR1 direction. A drive force provided from the fork portion 72 to the first ring 40 is transmitted also to the second ring 50 via the elastic members 60. Along with the movement of the first ring 40, the second ring 50 moves in the same direction. The fork portion 72, the first ring 40 and the second ring 50 integrally move in the arrow DR1 direction to come close to the shift gear 12.

In this case, also, the shift member 70 (fork portion 72) directly abuts on the first abutment portion 47 of the first ring 40 and thereby moves the first ring 40 in the axis direction. The shift member 70 thus provides a force required for the movement in the axis direction directly to the first ring 40. Since the shift member 70 moves in the arrow DR1 direction integrally with the first ring 40, no delay occurs in the first ring 40 in response to movement of the shift member 70. Movement of the shift member 70 (the fork portion 72) enables the engagement portions (first projection portions 41) of the first ring 40 to be inserted between the respective dogs 17 (17b, 17c) of the shift gear 12 at a proper timing.

On the other hand, in the switching mechanism 20A, the fork portion 72 moves the second ring 50 in the arrow DR3 direction. A driving force provided from the fork portion 72 to the second ring 50 is transmitted also to the first ring 40 via the elastic members 60. Here, although the second ring 50 moves in the arrow DR3 direction together with the fork portion 72, engagement of the first projection portions 41 with the dogs 17 of the shift gear 11 prevents the first ring 40 (first projection portion 41) from moving in the arrow DR3 direction. In other words, when the shift member 70 moves the second ring 50 in a direction away from the lower shift gear 11, each second projection portion 52 moves out from between two dogs 17, 17 with the first projection portions 41 engaged with the dogs. The state illustrated in FIGS. 10A and 10B in which only the first ring 40 is positioned between the dogs 17, 17 of the shift gear 11 is achieved, and the shift gear 11 and the first ring 40 continue rotating together with the countershaft 10.

In the switching mechanism 20B, the shift gear 12 rotates in the arrow AR direction at a rotation speed that is higher than that of the shift gear 11. As in the case of shifting from the neutral position to the shift gear 11, each dog 17 provided at a side face of the shift gear 12 comes close to a first projection portion 41 of the first ring 40, the first projection portion 41 being positioned on the front side in the rotation direction of the dog 17, and the dog 17 and the first projection portion 41 finally engage with each other. The shifting to the second gear (shift gear 12) is thus completed, and a rotation driving force of the shift gear 12 is transmitted to the countershaft 10 through the switching mechanism 20B. The countershaft 10 rotates faster than that in the case of the first gear. Consequently, the first ring 40 and the second ring 50 of the switching mechanism 20A rotate faster than that in the case of the shift gear 11.

Figure 11A:
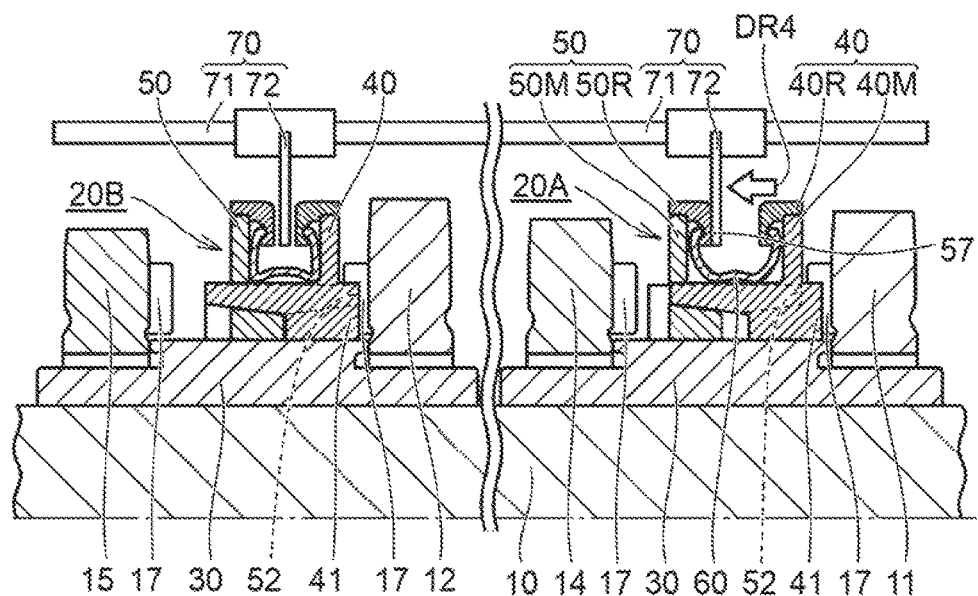
FIG. 11A is a cross-sectional view of the shift gears and switching mechanisms of the transmission when the first ring (first projection portions) of the switching mechanism 20A moves away from the dogs of the shift gear toward the front side in a rotation direction.
Figure 11B:
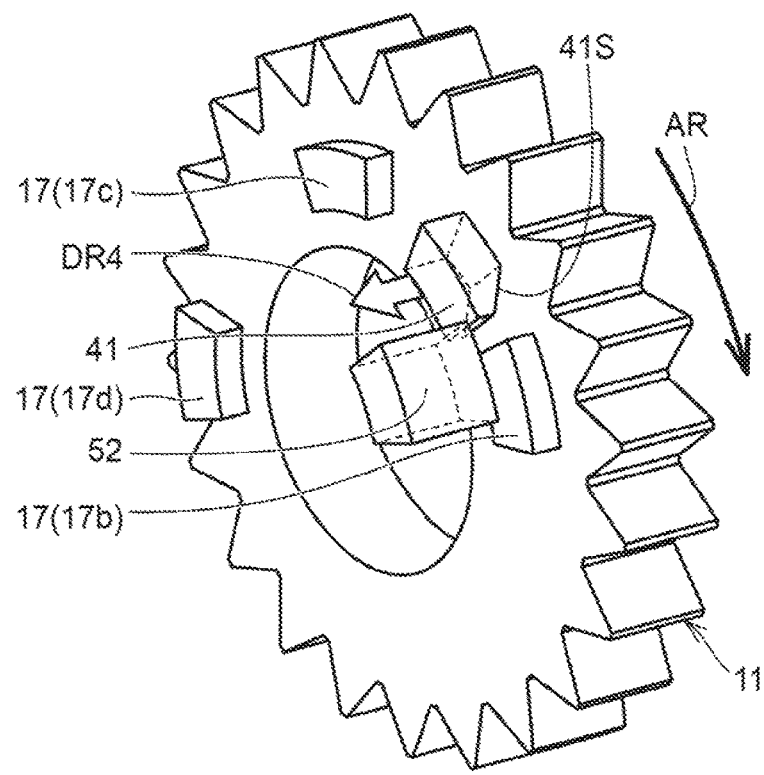
FIG. 11B is a perspective view of a shift gear, a first projection portion and a second projection portion according to FIG. 11A.

Referring to FIGS. 11A and 11B, in the switching mechanism 20A, as a result of the first ring 40 (the first projection portions 41) rotating faster than that in the case of the shift gear 11, the engagement (contact) between the first projection portions 41 of the first ring 40 and the dogs 17 of the shift gear 11 is cancelled. Each first projection portion 41 of the first ring 40 moves close to a dog 17 (17b) positioned immediately ahead of the dog 17 (17c) the first projection portion 41 engaged with last. Here, a driving force provided from the fork portion 72 to the second ring 50 (see an arrow DR4) is continuously transmitted also to the first ring 40 via the elastic members 60. After the cancellation of the engagement (contact) between the first projection portions 41 of the first ring 40 and the dogs 17 of the shift gear 11, the first ring 40 (first projection portion 41) gradually start moving in the axis direction away from the shift gear 11.

Figure 12A:
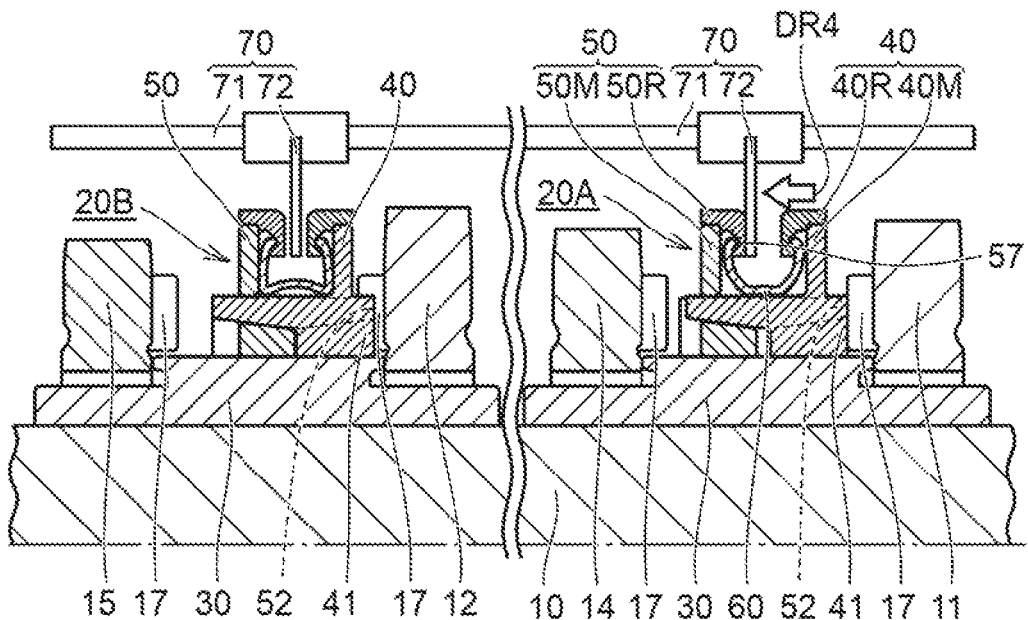
FIG. 12A is a cross-sectional view of the shift gears and the switching mechanisms of the transmission when the first ring (first projection portions) of the switching mechanism is moving out of the position between the dogs of the shift gear while being in contact with the dogs.
Figure 12B:
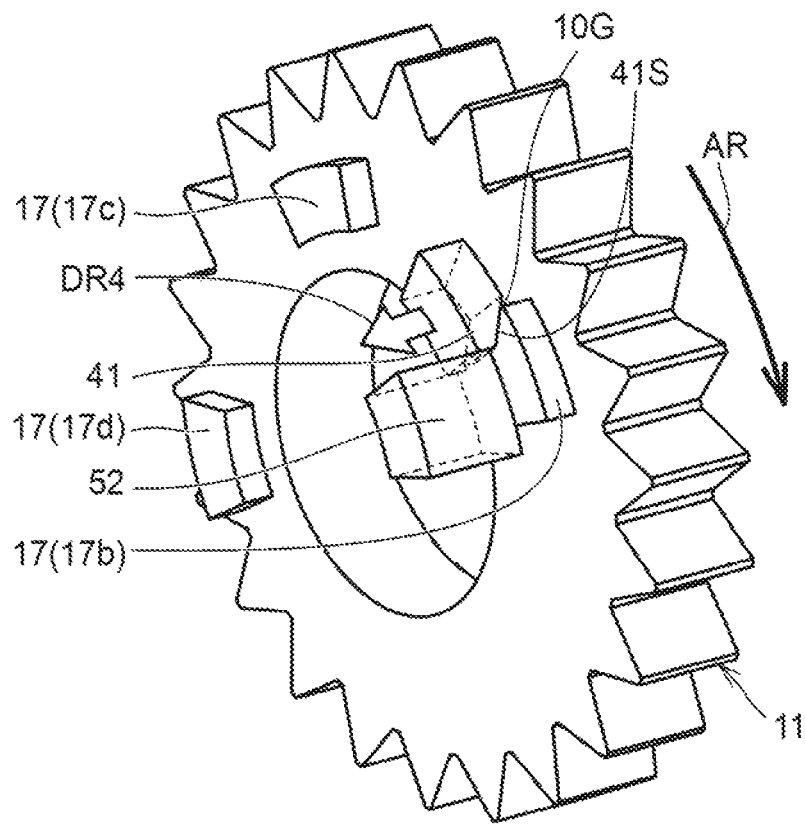
FIG. 12B is a perspective view of a shift gear, a first projection portion and a second projection portion according to FIG. 12A.

Referring to FIGS. 12A and 12B, finally, each first projection portion 41 of the first ring 40 catches up with the dog 17 (17b) positioned immediately ahead of the dog 17 (17c) the first projection portion 41 engaged with last. As described above, at the part on the front side in the rotation direction (arrow AR) of each first projection portion 41, an inclined surface 41S extending further toward the rear side in the rotation direction as further away from the side face of the first ring 40 (body 44) is formed. Therefore, the inclined surface 41S of each first projection portion 41 comes into contact with the relevant dog 17 of the shift gear 11 rotating more slowly than the first ring 40, whereby the first projection portion 41 is repelled. Accordingly, the entire first ring 40 moves in the arrow DR4 direction. In other words, in addition to the driving force provided from the fork portion 72 to the second ring 50 (see the arrow DR4) being continuously transmitted to the first ring 40 via the elastic members 60, the first projection portions 41 of the first ring 40 are repelled in the axis direction by the dogs 17, whereby the first ring 40 can reliably move in such direction.

Figure 13A:
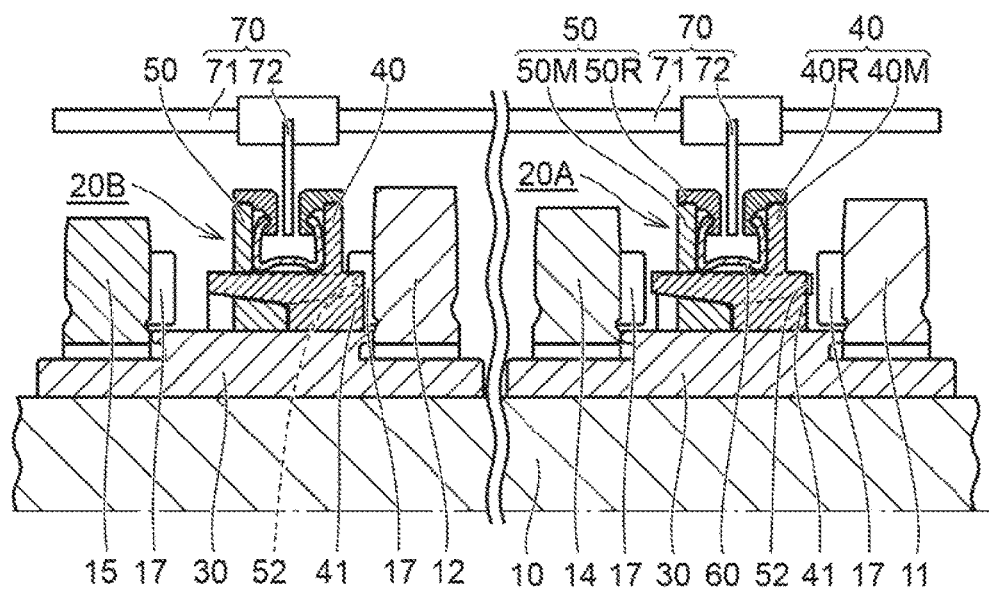
FIG. 13A is a cross-sectional view of the shift gears and the switching mechanisms of the transmission when the first ring (first projection portions) and the second ring (second projection portions) of the switching mechanism has moved out of the position between the dogs of the shift gear.
Figure 13B:
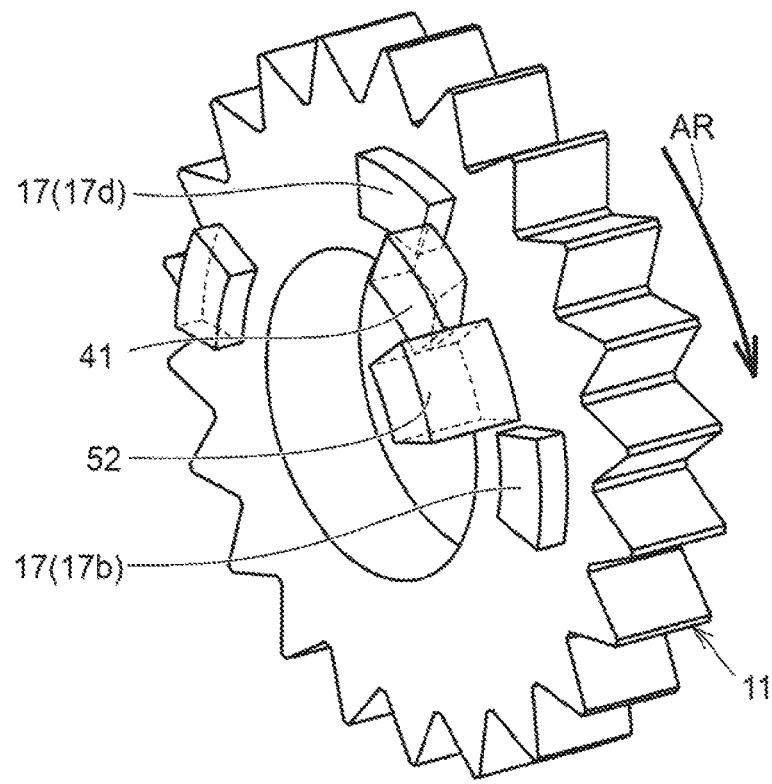
FIG. 13B is a perspective view of a shift gear, a first projection portion and a second projection portion according to FIG. 13A.

The state illustrated in FIGS. 13A and 13B is achieved. The switching mechanism 20A returns to the neutral position, and the shifting to the second gear (shift gear 12) is completed. As described above, the present embodiment enables provision of gear shift operation that can prevent occurrence of torque interruption in a gear shift (shifting up), by the switching mechanisms 20A, 20B. This operation is also performed in shifting up from the second gear to the third gear, from the third gear to the fourth gear, from the fourth gear to the fifth gear, and from the fifth gear to the sixth gear.

Next, shifting-down from the second gear to the first gear will be described. In shifting down from the second gear to the first gear (shift gear 11), with a clutch disengaged, the fork portion 72 of the switching mechanism 20B moves the first ring 40 and the second ring 50 of the switching mechanism 20B in a direction away from the shift gear 12. Furthermore, the fork portion 72 of the switching mechanism 20A moves the first ring 40 and the second ring 50 of the switching mechanism 20A in the direction closer to the shift gear 11.

The switching mechanism 20B returns to the neutral position, and the clutch is re-engaged, whereby the shifting-down to the first gear (shift gear 11) is completed. This operation is also performed in shifting from the sixth gear to the fifth gear, from the fifth gear to the fourth gear, from the fourth gear to the third gear and from the third gear to the second gear.

Operations and effects of the present embodiment will be described below. According to the configuration of the above-described embodiment, a first ring 40 includes first projection portions 41 (engagement portions) to be engaged with dogs 17, and a first abutment portion 47 that allows a fork portion 72 of a shift member 70 to abut thereon. The shift member 70 directly abuts on the first abutment portion 47 of the first ring 40 and thereby moves the first ring 40 in the axial direction. A second ring 50 receives a driving force via elastic members 60 and follows the movement of the first ring 40. The shift member 70 provides a force required for the movement in the axis direction directly to the first ring 40. Since the shift member 70 moves integrally with the first ring 40, no delay occurs in the first ring 40 in response to movement of the shift member 70. The engagement portions (first projection portions 41) of the first ring 40 can be inserted between respective dogs 17, 17 of a shift gear at a proper timing by means of movement of the shift member 70. Therefore, a gear shift lag due to a retry of engagement or decrease in durability of the engagement portions and the dogs due to frequent collision of these members can be suppressed. Also, the first ring 40 and the second ring 50 of the switching mechanism 20A can easily be moved by the fork portion 72 of the shift member 70 alone. It is more preferable to use what is called a dog window tracking system to more accurately identify positions (phases) of the dogs 17 by learning, for enhancement in gear shift performance.

Also, in the configuration according to the present embodiment, a second projection portion 52 is disposed between two dogs 17, 17, together with a first projection portion 41. In other words, under the condition in which the shift gear is rotating, it is necessary to insert a first projection portion 41 (engagement portion) between two dogs 17, 17 at a proper timing. If the timing is off, each first projection portion 41 comes into contact with the respective dogs 17, and in some cases, a retry may be required. In order to reduce the number of retries to enhance the gear shift performance, it is preferable that there be a certain clearance in dimension between dogs 17, 17 relative to a width dimension in the rotation direction of an engagement portion (first projection portion 41). Here, in the present embodiment, it is possible that each first projection portion 41 first enters a position between the relevant dogs 17, 17 and then each second projection portion 52 enters a position between the relevant dogs 17, 17. Compared to a case where one large engagement portion enters a position between two dogs 17, 17, in a case where one first projection portion 41 enters a position between dogs 17, 17, the first projection portion 41 (engagement portion) is less likely to come into contact with the dogs 17 and a retry is also less likely to be required. Therefore, a gear shift lag due to a retry of engagement or decrease in durability of the engagement portions and the dogs due to frequent collision of these members can be suppressed.

In a state in which only each first projection portion 41 has entered between the relevant dogs 17, 17, there is still a large clearance between the dogs 17, 17 and the first projection portion 41. This clearance is eliminated by a second projection portion 52 entering the position between the dogs 17, 17 next. During the vehicle moving, relative rotation between a shift gear and a first ring 40 (second ring 50) may occur upon receipt of drive forces in opposite directions. Such relative rotation may cause backlash. Therefore, in the present embodiment, a clearance formed between dogs 17, 17 and a first projection portion 41 is reduced by a second projection portion 52. In other words, the two-fraction configuration using the first projection portion 41 and the second projection portion 52 is advantageous not only in inserting the first projection portion 41 between the dogs 17, 17 but also after inserting the first projection portion 41 and the second projection portion 52 between the dogs 17, 17.

As described above, in the part on the front side in the rotation direction (arrow AR) of each first projection portion 41, an inclined surface 41S extending further toward the rear side in the rotation direction as further away from the side face of the first ring 40 (body 44) is formed. After the second ring 50 moving away from the positions between the dogs 17, 17 of the shift gear 11, if a rotation speed of the first ring 40 becomes larger than a rotation speed of the shift gear 11 because of shifting-up, the first projection portions 41 of the first ring 40 catch up with and collide with the respective dogs 17 positioned ahead in the rotation direction. In this case, the inclined surface 41S of each first projection portion 41 of the first ring 40 has an inclined surface in a surface of contact with the dog 17 which caught up, the first ring 40 is thus easily repelled toward the neutral position (the side on which the second ring 50 is positioned). Operations and effects that are similar to the above can be provided in shifting up to the third to sixth gears.

As described above, in the present embodiment, a first ring 40 includes a first side wall 45 extending in the radial direction, and a second ring 50 includes a second side wall 55 extending in the radial direction. Elastic members 60 are disposed on the inner side in the radial direction relative to the first side wall 45 and the second side wall 55, and hold the first side wall 45 and the second side wall 55 from the outside in the axis direction. Such configuration enables the elastic members 60 to be disposed using a space surrounded by dog rings 40M, 50M and fork rings 40R, 50R, and also enables easy assembling of these rings.

As described above, in the present embodiment, in the surface of the first side wall 45 positioned on the side opposite to the lower shift gear 11 in the axis direction forms the first abutment portion 47 that allows the shift member 70 to abut thereon, and the surface of the second side wall 55 on the side that is the same as the lower shift gear 11 in the axis direction forms the second abutment portion 57 that allows the shift member 70 to abut thereon. Such configuration enables the first side wall 45 and the second side wall 55 to be disposed to face each other and thus enables the fork portion 72 of the shift member 70 to have a simple configuration.

As described above, in the present embodiment, a first ring 40 is formed by joining a dog ring 40M (third ring) provided with first projection portions 41 and a fork ring 40R (fourth ring) provided with a first side wall 45 to each other. The second ring 50 is formed by joining a dog ring 50M (fifth ring) provided with second projection portions 52 and a fork ring 50R (sixth ring) provided with a second side wall 55 to each other. Although the dog ring 40M and the fork ring 40R can be fabricated integrally, forming the dog ring 40M and the fork ring 40R using different members enables, e.g., use of a material optimized for the function of the first projection portions 41 for the dog ring 40M and use of a material optimized for the function of the first side wall 45 for the fork ring 40R. Also, the formation of the fork ring 40R and the dog ring 40M using different members facilitates attachment (assembling) of elastic members 60 to the fork ring 40R and the dog ring 40M. These operations and effects also apply to the dog ring 50M and the fork ring 50R.

Figure 14:
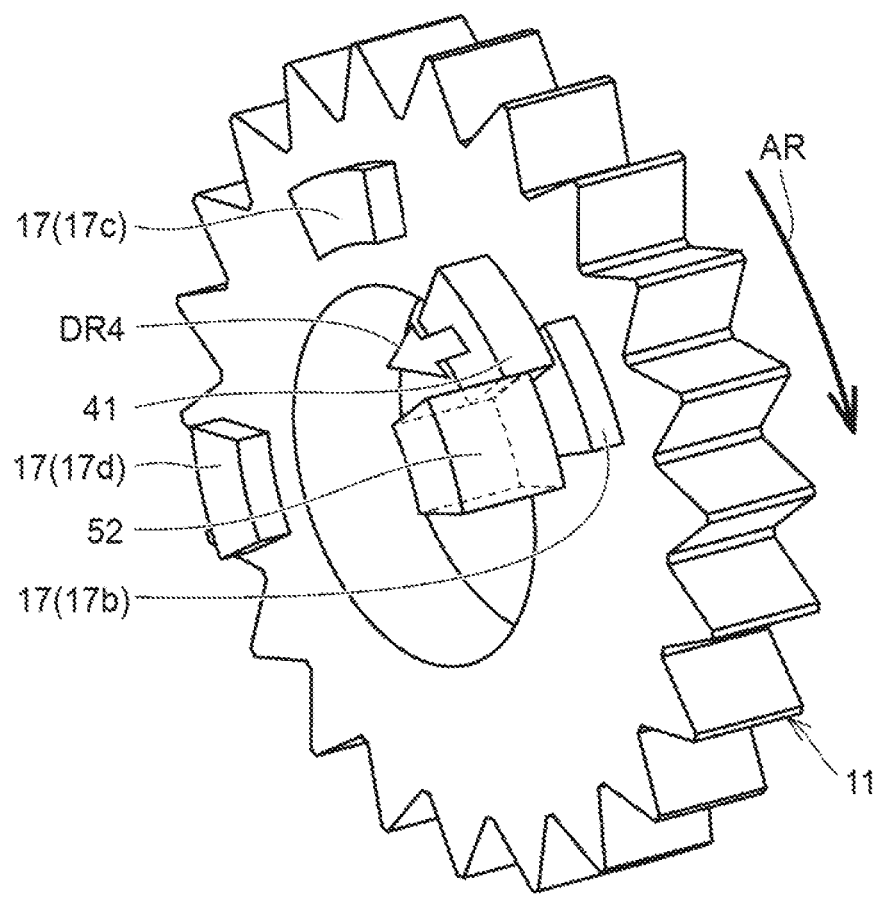
FIG. 14 is a perspective view of a transmission according to a first alternation of the present embodiment.

Next, a first alternation of the embodiment of the present disclosure will be described. A transmission according to the first alternation will be described with reference to FIG. 14. In this transmission, a part on the front side in a rotation direction (arrow AR) of each first projection portion 41 is perpendicular to a side face of a first ring 40 (body 44) and has a flat plane shape extending along a radial direction of the first ring 40 (body 44). Such configuration also allows, in shifting-up, each first projection portion 41 of the first ring 40 to catch up with a relevant dog 17 (17b) positioned immediately ahead of a dog 17 (17c) the first projection portion 41 engaged with last. The first projection portions 41 come into contact with the respective dogs 17 of the shift gear 11 that is rotating more slowly than the first ring 40 and thereby can be repelled in an axis direction.

Next, a second alternation of the present embodiment will be described. A transmission according to the second alternation will be described with reference to FIG. 15. In this transmission, the dog ring 40M and the fork ring 40R in the above-described embodiment are integrally fabricated as a first ring 40, and the dog ring 50M and the fork ring 50R are also integrally fabricated as a second ring 50. In such configuration, also, the first ring 40 includes first projection portions 41 (engagement portions) to be engaged with dogs 17 and a first abutment portion 47 that allows a fork portion 72 of a shift member 70 to abut thereon. The shift member 70 directly abuts on the first abutment portion 47 of the first ring 40 and thereby moves the first ring 40 in an axis direction. The shift member 70 provides a force required for the movement in the axis direction directly to the first ring 40. Since the shift member 70 moves integrally with the first ring 40, no delay occurs in the first ring 40 in response to movement of the shift member 70. Each engagement portion (first projection portions 41) of the first ring 40 can be inserted between relevant dogs 17, 17 of the shift gear at a proper timing, by means of movement of the shift member 70. Therefore, a gear shift lag due to a retry of engagement or decrease in durability of the engagement portions and the dogs due to frequent collision of these members can be suppressed.

Figure 15:
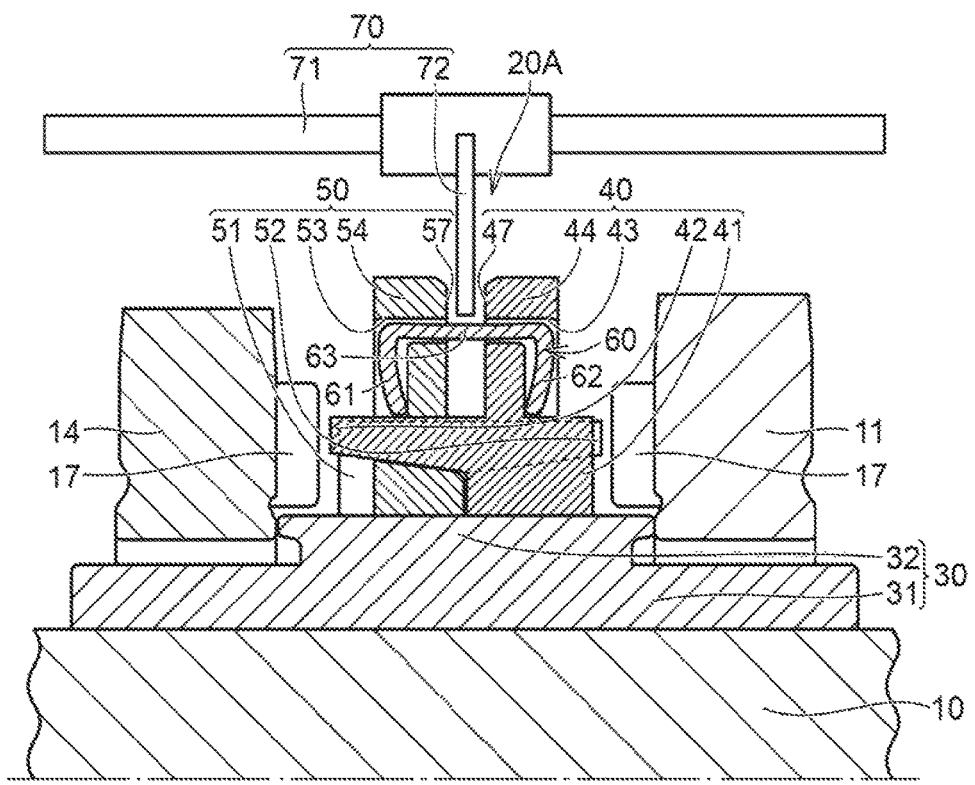
FIG. 15 is a cross-sectional view of a transmission according to a second alternation of the present embodiment.

As illustrated in FIG. 15, each elastic member 60 can be disposed in such a manner that a connection portion 63 is positioned on the outer side in a radial direction and holding portions 61, 62 are positioned on the inner side in the radial direction. Such configuration also enables provision of operations and effect that are substantially similar to those of the above-described embodiment. A shape of the elastic member 60 is not limited to a substantial C-shape (squared U-shape) as in the embodiment, and, e.g., coil springs may be used.

Although two examples have been described as alternations of the embodiment of the present disclosure, other alternations are possible. In other words, in the above-described embodiment, the sleeve 30 is used, but the sleeve 30 is not an essential component, and may be provided as necessary according to the arrangement of the shift gears 11 to 16.

The above embodiment has been described based on the configuration in the case where shift gears 11 to 16 are the driving side from among the shift gear 11 to 16 and the switching mechanisms 20A, 20B, 20C (that is, motive power from the engine is transmitted to the switching mechanisms via the shift gears 11 to 16). For example, in the part on the front side in the rotation direction (arrow AR) of each first projection portion 41, an inclined surface 41S extending further toward the rear side in the rotation direction as further away from the side face of the first ring 40 (body 44) is formed. Such technical idea can be employed for a case where the shift gears 11 to 16 are the driven side (that is, motive power from the engine is transmitted to the shift gears 11 to 16 via the switching mechanisms).

For example, where the shift gears 11 to 16 are the driven side (that is, motive power from the engine is transmitted to the shift gears 11 to 16 via the switching mechanisms), for example, it is preferable that in a part on the rear side in the rotation direction (arrow AR) of each first projection portion 41, an inclined surface 41S extending further toward the front side in the rotation direction as further away from the side face of the first ring 40 (body 44) be formed.

Although the embodiment and alternations have been described above, the above disclosure provides mere examples in any respect and provides no limitation. The technical scope of the present disclosure is indicated by the claims, and is intended to include all of alternations having meanings equivalent to the claims and within a scope equivalent to the claims.

What is claimed is:

1. A transmission comprising:
   a shift gear configured to be rotatably attached to a shaft, the shift gear including a plurality of dogs provided to protrude at a side face of the shift gear; and
   a switching mechanism provided for the shift gear, the switching mechanism being configured to switch between a state in which the shift gear and the shaft rotate integrally and a state in which the shift gear and the shaft do not rotate integrally, the switching mechanism including a first ring, a second ring, an elastic member and a shift member,
   the first ring being configured to rotate integrally with the shaft, the first ring including a first projection portion, a communication portion and a first abutment portion, the first projection portion having a shape extending toward the shift gear in an axis direction of the shaft, the communication portion having a shape extending in the axis direction, the first abutment portion being provided on a side opposite to the shift gear in the axis direction, and the first abutment portion allowing the shift member to abut on the first abutment portion,
   the second ring being configured to rotate integrally with the first ring, the second ring being disposed on the side opposite to the shift gear in the axis direction relative to the first ring, the second ring including a second projection portion and a second abutment portion, the second projection portion having a shape extending toward the shift gear in the axis direction, the second projection portion being disposed to extend through an inside of the communication portion of the first ring, and the second abutment portion being provided on a side that is the same as the shift gear in the axis direction, and the second abutment portion allowing the shift member to abut on the second abutment portion, and
   the shift member being configured to move the first ring in a direction closer to the shift gear, the first projection portion engaging with a dog from among the plurality of dogs, the second projection portion being disposed together with the first projection portion between two of the dogs, and when the shift member moves the second ring in a direction away from the shift gear, the second projection portion being configured to come out from between the two of the dogs while the first projection portion engages with the dog, the elastic member being configured to connect the first ring and the second ring, and the elastic member providing a biasing force making a distance in the axis direction between the first ring and the second ring have a fixed value to the first ring and the second ring using an elastic resilient force of the elastic member, and the shift member being configured to provide a force in the axis direction to the first ring and the second ring.

2. The transmission according to claim 1, wherein the shift gear and the switching mechanism make up a gear shift set, the transmission includes at least two gear shift sets, the gear shift sets include a gear shift set including at least a lower shift gear, the gear shift set including at least the lower shift gear includes a plurality of dogs provided to protrude at a side face of the shift gear, the first projection portion has a shape extending toward the lower shift gear in the axis direction, the first abutment portion is provided on a side opposite to the lower shift gear in the axis direction, the first abutment portion allows the shift member to abut on the first abutment portion, the second ring is disposed on the side opposite to the lower shift gear relative to the first ring, the second abutment portion is provided on a side that is the same as the lower shift gear in the axis direction, the second abutment portion allows the shift member to abut on the second abutment portion, and the shift member moves the first ring in a direction closer to the lower shift gear and the first projection portion engages with a dog from among the plurality of dogs, and when the shift member moves the second ring in a direction away from the lower shift gear, the second projection portion is configured to come out from between two of the dogs while the first projection portion engages with the dog.

3. The transmission according to claim 2, wherein motive power from an engine is transmitted to the switching mechanism via the shift gear, the first projection portion includes an inclined surface, and the inclined surface extends further toward a rear side in a rotation direction of the first projection portion as further away from a side face of the first ring in a part on a front side in the rotation direction of the first projection portion.

4. The transmission according to claim 2, wherein motive power from an engine is transmitted to the shift gear via the switching mechanism, the first projection portion includes an inclined surface, and the inclined surface extends further toward a front side in a rotation direction of the first projection portion as further away from a side face of the first ring in a part on a rear side in the rotation direction of the first projection portion.

5. The transmission according to claim 2, wherein the first ring includes a first side wall extending in a radial direction, the second ring includes a second side wall extending in the radial direction, the elastic member includes a pair of holding portions and a connection portion, the pair of holding portions is configured to hold the first side wall and the second side wall between the pair of holding portions from outside in the axis direction, the connection portion is provided on an inner side in the radial direction of the pair of holding portions, and the connection portion is configured to connect end portions of the pair of holding portions.

6. The transmission according to claim 5, wherein the first side wall includes the first abutment portion, the first abutment portion includes a surface of the first side wall, the surface of the first side wall being positioned on the side opposite to the lower shift gear in the axis direction, and the shift member abuts on the surface of the first side wall, the second side wall includes the second abutment portion, and the second abutment portion includes a surface of the second side wall, the surface of the second side wall being positioned on the side that is the same as the lower shift gear in the axis direction, and the shift member abuts on the surface of the second side wall.

7. The transmission according to claim 5, wherein the first ring includes a third ring and a fourth ring, the third ring and the fourth ring are joined to each other, the third ring includes the first projection portion, and the fourth ring includes the first side wall, and the second ring includes a fifth ring and a sixth ring, the fifth ring and the sixth ring are joined to each other, the fifth ring includes the second projection portion, and the sixth ring includes the second side wall.

* * * * *